US012314240B1

(12) United States Patent
Opincariu et al.

(10) Patent No.: US 12,314,240 B1
(45) Date of Patent: May 27, 2025

(54) INCREMENTAL PARTITION INDEX UPDATE USING BLOOM FILTERS

(71) Applicant: Amazon Technologies, Inc., Seattle, WA (US)

(72) Inventors: Daniel Opincariu, Redmond, WA (US); Zhuonan Song, Bellevue, WA (US); Miradham Kamilov, Vancouver (CA); Baosheng Wang, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 133 days.

(21) Appl. No.: 17/205,839

(22) Filed: Mar. 18, 2021

(51) Int. Cl.
G06F 16/22 (2019.01)
G06F 16/23 (2019.01)
G06F 16/2455 (2019.01)
G06F 16/2458 (2019.01)

(52) U.S. Cl.
CPC ...... G06F 16/2272 (2019.01); G06F 16/2358 (2019.01); G06F 16/24554 (2019.01); G06F 16/2462 (2019.01)

(58) Field of Classification Search
CPC ............ G06F 16/2272; G06F 16/2358; G06F 16/24554; G06F 16/2462
See application file for complete search history.

(56) References Cited

U.S. PATENT DOCUMENTS

| | | | |
|---|---|---|---|
| 8,239,394 B1* | 8/2012 | Hogue | G06F 16/332 707/754 |
| 10,180,977 B2* | 1/2019 | Fisher | G06F 16/2322 |
| 10,503,737 B1* | 12/2019 | Manville | G06F 16/2455 |
| 10,606,766 B1 | 3/2020 | Rellinger et al. | |
| 2005/0144176 A1 | 6/2005 | Lei et al. | |
| 2006/0070019 A1 | 3/2006 | Vishnumurty et al. | |
| 2007/0112456 A1 | 5/2007 | Sanka et al. | |
| 2009/0300002 A1 | 12/2009 | Thomas et al. | |
| 2010/0228701 A1* | 9/2010 | Harris, III | H04L 51/212 711/216 |
| 2013/0132408 A1* | 5/2013 | Little | G06F 16/2255 707/754 |
| 2017/0070492 A1 | 3/2017 | Rubin et al. | |
| 2017/0228409 A1* | 8/2017 | Darcy | G06F 11/1402 |
| 2018/0004786 A1* | 1/2018 | Danilov | G06F 16/2329 |
| 2018/0329940 A1 | 11/2018 | Tiku et al. | |
| 2020/0117824 A1 | 4/2020 | Upadhyay et al. | |

OTHER PUBLICATIONS

Arindam Bhattacharya, Srikanta Bedathur, and Amitabha Bagchi. 2020. Adaptive Learned Bloom Filters under Incremental Workloads. In Proceedings of the 7th ACM IKDD CoDS and 25th COMAD (CoDS COMAD 2020). Association for Computing Machinery, New York, NY, USA, 107-115. (Year: 2020).*

(Continued)

*Primary Examiner* — Brittany N Allen
(74) *Attorney, Agent, or Firm* — Eversheds Sutherland (US) LLP

(57) ABSTRACT

Systems, devices, and methods are provided for incremental partition updates. In at least one embodiment, indexing Bloom filters and incremental update Bloom filters are utilized to identify a set of candidate partitions of a distributed data set, such as in the context of a data lake. Queries may be processed using these candidate partitions.

19 Claims, 11 Drawing Sheets

(56) References Cited

OTHER PUBLICATIONS

Q. Dang "Recommendation for Applications Using Approved Hash Algorithms" Computer Security, Aug. 2012; DOC—NIST, 25 pages.
"S. Tarkoma, C. E. Rothenberg and E. Lagerspetz, ""Theory and Practice of Bloom Filters for Distributed Systems,"" in IEEECommunications Surveys & Tutorials, vol. 14, No. 1, pp. 131-155, First Quarter 2012, doi: 10.1109/SURV.2011.031611.00024. (Year: 2012)".
"D. Gupta and S. Batra, ""A short survey on bloom filter and its variants,"" 2017 International Conference on Computing,Communication and Automation (ICCCA), 2017, pp. 1086-1092, doi: 10.1109/CCAA.2017.8229957. (Year:2017)".

* cited by examiner

INCREMENTAL PARTITION INDEX UPDATE USING BLOOM FILTERS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services or systems that interact with clients. For example, such distributed systems may provide database systems to clients. As the scale and scope of database systems have increased, the tasks of provisioning, administering, and managing system resources have become increasingly complicated. For example, the costs to search, analyze, and otherwise manage data sets can increase with the size and scale of the data sets. Creating and maintaining indexes of data sets can be challenging and computationally demanding.

Figure 1:
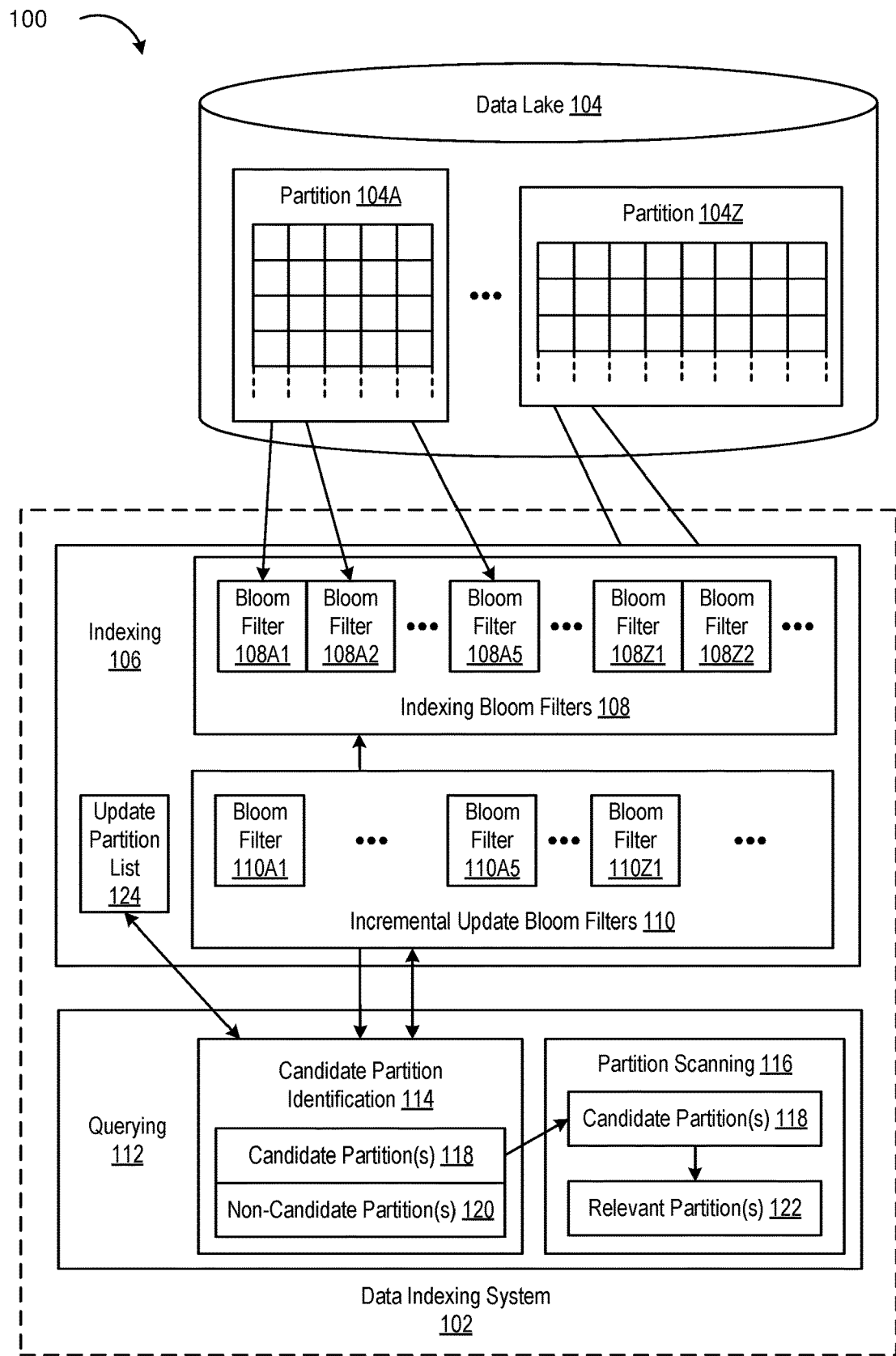
FIG. 1 illustrates an example of a computing environment for indexing partitions using distributed Bloom filters and applying incremental updates to maintain such indexes, in accordance with at least one embodiment.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for incremental partition updates using Bloom filters. A Bloom filter refers to a type of probabilistic data structure that can be used to determine set membership in a space-efficient manner. In the context of big data, a data lake includes a distributed object store or distributed set of object stores that store objects such as records at massive scale on the order of petabytes or even larger. Bloom filters can be utilized to implement efficient query strategies on such large data sets while also being space efficient. For example, a data set of a distributed object store which is distributed across many partitions can have a Bloom filter for each partition that can be used to determine whether a particular value could possibly be in or is definitely not in the partition. An indexing Bloom filter may be created for a partition at an initial point in time, such as when the data set is initially provisioned for use in the data lake. This process may be repeated for each partition, so that there is an indexing Bloom filter available for efficient querying of the entire data set. If data in a partition is subsequently changed, the change may be used to trigger the creation of an incremental update Bloom filter. When the values of indexed fields are modified or deleted, a workflow to perform an incremental update for the partition may be initiated. The incremental update Bloom filters may be used to reflect an updated state of a partition at a later point in time after the creation of the initial indexing Bloom filter. A data indexing system may use a combination of indexing Bloom filters and incremental update Bloom filters to process queries and/or identify candidate partitions, non-candidate partitions, relevant partitions, non-relevant partitions, and so on. As described in greater detail below, techniques described herein can be utilized to implement systems and methods that perform incremental update of partitions using Bloom filters.

As one skilled in the art will appreciate in light of this disclosure, embodiments may be capable of achieving certain technical advantages, including some or all of the following: (1) improving input/output (I/O) and network usage in a big data environment by using Bloom filters to build incremental updates to indexes so that queries can be restricted to a relatively small set of candidate partitions and a larger set of partitions excluded, thereby reducing overall I/O and network usage; (2) improving the use of computing resources in a big data environment by using Bloom filters to build incremental updates to indexes so that queries can be restricted to a relatively small set of candidate partitions such that a larger set of partitions can be excluded, need not be accessed; (3) improving the use of storage and memory resources in a big data environment by generating space-efficient Bloom filters to index a large number of partitions instead of using larger indices or hash tables and using additional Bloom filters to track incremental updates to the index so that the index can continue to be used even after changes to the underlying data set have been applied; or (4) improving the latency of queries by using Bloom filters to build incremental updates to indexes so that queries can be restricted to a relatively small set of candidate partitions such that a larger set of partitions can be excluded, thereby reducing the overall latency of queries; and so on.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example of a computing environment 100 for indexing partitions using distributed Bloom filters and applying incremental updates to maintain such indexes, in accordance with at least one embodiment. A data indexing system 102 may provide clients with efficient read access to large sets of data such as a data lake 104. Data indexing system 102 may comprise or otherwise have access to an indexing component 106 that stores one or more indexing Bloom filters 108, one or more incremental update Bloom filters 110, and an update partition list 124. Data indexing system 102 may comprise a querying component 112 which comprises a candidate partition identification component 114 and a partition scanning component 116. Candidate partition identification component 114 may be used to determine candidate partition(s) 118 and non-candidate partitions(s) 120 of data lake 104. Partition scanning component 116 may be used to identify relevant partition(s) 122 from candidate partition(s) 118.

Data indexing system 102 may be accessible by clients via any suitable communications network such as those described in greater detail below. In at least one embodiment, a client (e.g., client computing device) submits a web application programming interface (API) request to a computing resource service provider frontend server which routes the request to data indexing system 102 for fulfillment. The data indexing system 102 and/or data lake 104 may be hosted by a computing resource service provider and/or implemented using a distributed system. The data lake 104 may include a distributed object store or distributed set of object stores that store objects such as records. The records may include values in various fields and may be stored according to no schema or a partial schema. The data lake 104 may be cataloged but not covered using traditional indexing techniques (e.g., B+ trees). Data lake 104 may capture large amounts of data (e.g., petabytes of data, or larger) generated by one or more entities. Data lake 104 may be organized into a set of partitions 104A-104Z and data lake 104 may be used to store several different types of data in various formats.

A particular data set may be divided into partitions to improve performance, e.g., to improve the performance of data access. A very large data set may have thousands or millions of partitions potentially representing terabytes of data. For example, a data lake 104 capturing timestamped data objects may be partitioned by a field such as "day" such that data timestamped for one day is stored in a different partition than data timestamped for another day. Timestamps can be used, for example, to represent when a data object was created, when an order was created, and so on. However, a data lake 104 partitioned by date (e.g., order date) may not be partitioned by another field such as an identifier associated with the record (e.g., order number). To quickly find data in the data lake 104 for a particular identifier (or other field that was not used for partitioning), data indexing system 102 may generate a distributed set of Bloom filters 108 and use those filters to perform efficient queries in which only a portion of the partitions 104A-104Z are examined.

Using techniques described in greater detail below, Bloom filters can be utilized to identify candidate and non-candidate partitions for processing a query such that non-candidate partitions can be excluded or ignored as being irrelevant. Bloom filters can be utilized to determine that a particular partition does not include a certain field value (e.g., a value being queried). Partitions that do not include a value being queried for can, in at least some embodiments, be ignored or marked as a non-candidate partition, indicating that such partitions can be ignored or otherwise excluded from processing of the query. In at least one embodiment, a system or component thereof can avoid loading a partition (e.g., avoiding loading archival or "cold" storage which can delay query processing) if it is marked as a non-candidate partition. A Bloom filter for a data set (e.g., of a partition or portion thereof) may be more space-efficient than various deterministic data structures that can be used for indexing and/or searching, such as B+ trees.

Data lake 104 may include a plurality of object stores that are stored in a distributed manner. Object stores may differ in their performance characteristics, application programming interfaces (APIs), storage architectures, and/or other attributes. Objects in one object store in the data lake 104 may represent a different structure and/or different data types than objects in another object store. Objects in the data lake 104 may include object blobs or files. Objects in the data lake 104 may include semi-structured data (e.g., CSV files, logs, XML files, JSON files, and so on). Objects in the data lake 104 may include unstructured data (e.g., e-mails, word processing documents, PDFs, and so on). Objects in the data lake 104 may include binary data (e.g., images, audio, and video). In some embodiments, data lake 104 includes objects that are not stored as structured data in tables that organize data by rows and columns. In some embodiments, at least some of the records in the data lake 104 are stored without using a schema. A schema may represent a formal definition of the structure or organization of a data store. In some embodiments, at least some of the records are stored in the data lake 104 according to a partial schema. A partial schema may partially but not completely define the structure or organization of a data store. In some embodiments, some of the records may be stored in one object store according to a partial schema that differs from others of the records in another object store.

At least some of the data lake 104 may be archived, infrequently updated, and/or read-only under normal use, at least after a period of time. For example, an entity that enables Internet-based sales from an electronic catalog of goods and services may maintain one or more data sets to store data for customer orders. Older order information may be archived, e.g., in a data set that is partitioned by order date such that no additional data is added to a partition after sufficient time has passed since the corresponding date of the partition. Due to their infrequently changing nature, the partitions 104A-104Z may be scanned once to create indices that can be used again and again for new queries of the partitions. The data indexing system 102 may include a component 110 for indexing of the data lake 104. The indexing component 106 may generate and/or store a plurality of Bloom filters 108. In some embodiments, a Bloom filter is a space-efficient, probabilistic data structure that indicates whether a value is possibly included in a set of values or whether the value is definitely not in the set. A query of a Bloom filter may return false positives but not false negatives.

A Bloom filter may refer to a type of probabilistic data structure that can be generated by applying one or more hash functions to a set of values. A Bloom filter may include a bit array, and values in the set may be mapped (via the hash function(s)) to positions in the bit array. An empty Bloom filter may represent an array of n bits that are initially set to 0. Each hash function in a set of h hash functions (h≥1) may map some value to one of the n array positions in a uniform random distribution. The size n of the Bloom filter may be proportional to a small constant representing a desired false positive rate and/or proportional to the number of values to be added to the filter. A value may be added to the Bloom filter by providing it to each of the h hash functions to get h array positions. The bits at those array positions may be set to 1. In some cases, such as those in which a counting Bloom filter is utilized, values are added to the Bloom filter by incrementing a counter. In some embodiments, additional values may be added to a Bloom filter, but values may not be removed from the filter. While various embodiments described in connection with FIG. 1 utilize Bloom filters, other types of probabilistic data structures can also be utilized.

For a given partition that includes data values in different fields, a plurality of Bloom filters may be generated for one or more fields to capture the possibility that particular values are found in the field(s). As shown in the example of FIG. 1, the partitions for one or more data sets may include partitions 104A through 104Z. A Bloom filter 108A1 may be generated by the indexing component 106 to represent the first field of the partition 104A, another Bloom filter 108A2 may be generated by the indexing component to represent the second field of the partition 104A, yet another Bloom filter 108A5 may be generated by the indexing component to represent the fifth field of the partition 104A, and so on. Similarly, a Bloom filter 108Z1 may be generated by the indexing component 106 to represent the first field of the partition 104Z, another Bloom filter 108Z2 may be generated by the indexing component to represent the second field of the partition 104Z, and so on.

In some embodiments, one Bloom filter may be generated per field per partition. In some embodiments, a plurality of Bloom filters may be generated per field per partition. In some embodiments, one Bloom filter may be generated per a plurality of fields. In various embodiments, Bloom filters may be generated for all of the fields in a partition or for only some of the fields in a partition. In some embodiments, a portion of fields may be selected for indexing using Bloom filters based (at least in part) on machine learning techniques that identify common or anticipated query attributes, while other fields may not be indexed using Bloom filters. The resulting set of Bloom filters 108 may be space-efficient and may require much less storage than a set of traditional indices (e.g., B+ trees) or hash tables usable for searching the data lake 104. Throughout this disclosure, Bloom filters 108 may be referred to as indexing Bloom filters, which refer to a Bloom filter that is generated to reflect the state of a partition of a data lake at a point in time. For example, a snapshot of a data lake may be taken at a point in time—for example, data and/or objects are transferred to a data lake—and indexed to reflect a current state of a data lake. Indexing Bloom filters may be used to search for a particular value in a partition and may be valid so long as the contents of the partition does not change after an indexing Bloom filter is generated. Techniques described below discuss how indexing Bloom filters and incremental update Bloom filters can be utilized in combination to provide efficient query processing without requiring indices be completely rebuilt.

In some embodiments, data stored within a data lake may change. For example, new objects may be added to a partition, existing objects may be updated or modified, and objects can be deleted. In some embodiments, changes to data or records stored in a data lake may occur infrequently such that data sets in a data lake are largely constant, but nevertheless can be modified. A change to a partition may refer to changes to data (e.g., modifications or deletions of existing objects, or creation of new objects) stored in the partition at some point in time after a partition was indexed to generate an indexing Bloom filter such as Bloom filters 108 illustrated in FIG. 1.

Indexing component 106 may generate, store, and provide access to incremental update Bloom filters 110 as illustrated in FIG. 1, according to at least one embodiment. As shown in FIG. 1, in at least one embodiment, the partitions for one or more data sets may include partitions 110A through 110Z. A Bloom filter 110A1 may be generated by the indexing component 106 to represent the first field of the partition 104A, another Bloom filter 110A2 may be generated by the indexing component to represent the second field of the partition 104A, and so on. Similarly, a Bloom filter 110Z1 may be generated by indexing component 106 to represent the first field of partition 104Z, another Bloom filter 110Z2 may be generated by the indexing component to represent the second field of partition 104Z, and so on. As shown in FIG. 1, an indexing Bloom filter 108A5 may have a corresponding incremental update Bloom filter 110A5 that reflects changes or updates that were made to the partition subsequent to generation of the indexing Bloom filter and can be used to identify candidate partitions, as described in greater detail elsewhere, such as discussed in connection with FIG. 7. An incremental update Bloom filter may be generated for each partition—in some cases, fewer than all of the partitions in data lake 104 have incremental update Bloom filters. The absence of an incremental update Bloom filter may indicate a lack of changes to the partition subsequent to generation of the indexing Bloom filter for the partition and that the corresponding indexing Bloom filter is up to date and can be used to identify candidate partitions and non-candidate partitions. Incremental update Bloom filters can be generated dynamically (e.g., in response to a query request or a request to change the state of the data lake), periodically (e.g., on a predetermined schedule), or in any other suitable manner. It is noted that in some embodiments (e.g., not illustrated in FIG. 1), a partition has multiple incremental update Bloom filters generated for a field that is indexed. In other words, an indexing Bloom filter may be associated with a set of two or more corresponding incremental update Bloom filters. For example, some or all indexing Bloom filters may have a corresponding incremental update Bloom filter pair that comprises a first Bloom filter for "opt-in" to reflect partition insertions and a second Bloom filter for "opt-out" to reflect partition deletions. Deletions and insertions in this context may refer to field-level and/or record-level deletions and insertions.

Incremental update Bloom filters may be generated in any suitable manner—for example, by using techniques described in connection with FIG. 7. In at least one embodiment, when a request to change the state of the data, the incremental update Bloom filter(s) for that partition may be updated based on the values of the fields that are being indexed. For example, consider the case where an indexing Bloom filter is created for a data set and then, subsequent to generation of the indexing Bloom filter, a record is deleted from the partition of the data set. Continuing with this illustrative example, as part of processing the deletion request, incremental update Bloom filters are generated over each of the indexed fields to indicate a possibility that the corresponding indexing Bloom filter is out-of-date.

The data indexing system 102 may include a component 112 for efficiently querying the data lake 104 using the Bloom filters 108. To begin searching a particular data set for a particular value, the querying component 112 may search the Bloom filters corresponding to the data set's partitions to determine the partitions that definitely do not include the value and also determine the partitions that possibly include the value. For example, to search a data set of customer order data for a particular customer ID, the querying component 112 may search the Bloom filters corresponding to the data set's partitions to exclude the partitions that definitely do not include the customer ID from additional scanning. To determine the particular partitions that include a particular value, a component 114 for candidate partition identification may use the indexing Bloom filters 108, incremental update Bloom filters 110, and update partition list 124 to identify candidate partitions 118 that may possibly include the value (false positives and/or true positives) while excluding non-candidate partitions 120 that definitely do not include the value (true negatives). In some embodiments, fewer than all of the Bloom filters are used to determine candidate partition(s) 118, as explained in greater detail below.

The querying component 112 may determine whether a value is present in a Bloom filter by providing the value to each of the h hash functions to get h array positions. If any of the bits at these positions is zero, then the querying component 112 may determine that the value is definitely not in the set (and thus definitely not present in the field(s) corresponding to the Bloom filter). However, if all of the bits at these positions are 1, then the querying component 112 may determine that the value is possibly in the set (and thus may or may not be present in the field(s) corresponding to the Bloom filter). The "possible yes" result may represent a false positive if the bits were set to 1 during the insertion of other values. If all of the Bloom filters for a given partition yielded a "definite no" result, then the querying component 112 may assign that partition to the set of non-candidate partitions 120.

Candidate partition identification component 114 may be a component of querying component 112 that uses indexing Bloom filters, incremental update Bloom filters 110, update partition list 124, or various combinations/portions thereof to determine a set of candidate partition(s) 118. Candidate partition(s) may refer to a set of partitions which can—but do not necessarily-include a value being searched for. Candidate partition identification component 114 may include utilizing techniques described in connection with FIG. 2, FIG. 7, and elsewhere in this disclosure to identify candidate partition(s) 118. In at least one embodiment, candidate partition identification component 114 iteratively checks whether a partition of a data lake is a candidate partition. For a given partition, candidate partition identification component 114 may first check update partition list 124 to determine whether the partition was updated subsequent to generation of indexing Bloom filters 108. Update partition list 124 may be implemented as any suitable data structure such as a list, array, vector, or the like and include identifiers corresponding to each partition that has changed after the indexing Bloom filters 108 were created. Continuing with this example, if the selected partition is not in the update partition list 124, then the corresponding indexing Bloom filter for the partition can be used to determine whether there is a possibility that the value being queried is in the partition. This determination can be performed by computing a hash of an ID being searched for to identify a corresponding Bloom filter position; if the position is in a "set" position, it indicates that the ID could be in the partition, but if the position is in an "unset" positive, then the ID is definitely not in the partition. This process can be repeated for each ID being searched for to determine, for each of the IDs, whether the partition could include the ID or definitely does not include the ID. If any of the Bloom filters for a given partition yielded a "possible yes" result, then the querying component 112 may assign that partition to the set of candidate partitions 118.

To determine the particular partitions that actually include a particular value, a component 116 for partition scanning may examine the candidate partitions 118 and not the non-candidate partitions 120 to identify one or more relevant partitions 122 that actually include the value. Relevant partition(s) 122 may be an empty set, a strict subset of candidate partition(s) 118, or may be identical to candidate partition(s) 118. By excluding a large number of non-candidate partitions 120 using the Bloom filters 108, the remaining candidate partitions 118 may be scanned efficiently to identify the relevant partitions 122 that actually include the value in one or more records. Even if the query of the Bloom filters 108 yielded a small number of false positives, the resources required to scan these additional partitions may be a small fraction of the resources that would otherwise be required to scan the entire data set.

The data indexing system 102 may use Bloom filters 108 for efficient querying of large data sets for a variety of purposes. For example, the Bloom filters 108 may be used to quickly find user data or customer data in a very large data set. The user data or customer data may be reported back to the user or deleted from the data lake 104 according to regulatory requirements (e.g., General Data Protection Regulation [GDPR] requirements). Without the data indexing system 102 and the use of Bloom filters 108, such a task may consume a prohibitive amount of computing resources (e.g., processors, memory, I/O, etc.) and compute time for a single query. By restricting a scan to only a small set of candidate partitions rather than the entire data set, the data indexing system 102 may significantly reduce the amount of computing resources (e.g., processors, memory, I/O, etc.) and the resulting cost for a query of a very large data set.

In one embodiment, one or more components of the data indexing system 102 and/or the data lake 104 may be implemented using resources of a provider network. The provider network may represent a network set up by an entity such as a private-sector business or a public-sector organization to provide one or more services (such as various types of network-accessible computing or storage) accessible via the Internet and/or other networks to a distributed set of clients. The provider network may include numerous services that collaborate according to a service-oriented architecture to provide the functionality and resources of the data indexing system 102 and/or data lake 104. The provider network may include numerous data centers hosting various resource pools, such as collections of physical and/or virtualized computer servers, storage devices, networking equipment and the like, that are used to implement and distribute the infrastructure and services offered by the provider. Compute resources may be offered by the provider network to clients in units called "instances," such as virtual or physical compute instances. In one embodiment, a virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). In various embodiments, one or more aspects of the data indexing system 102 may be implemented as a service of the provider network, the service may be implemented using a plurality of different instances that are distributed throughout one or more networks, and each instance may offer access to the functionality of the service to various clients. Because resources of the provider network may be under the control of multiple clients (or tenants) simultaneously, the provider network may be said to offer multi-tenancy and may be termed a multi-tenant provider network. The provider network may be hosted in the cloud and may be termed a cloud provider network. In one embodiment, portions of the functionality of the provider network, such as the data indexing system 102, may be offered to clients in exchange for fees.

Figure 11:
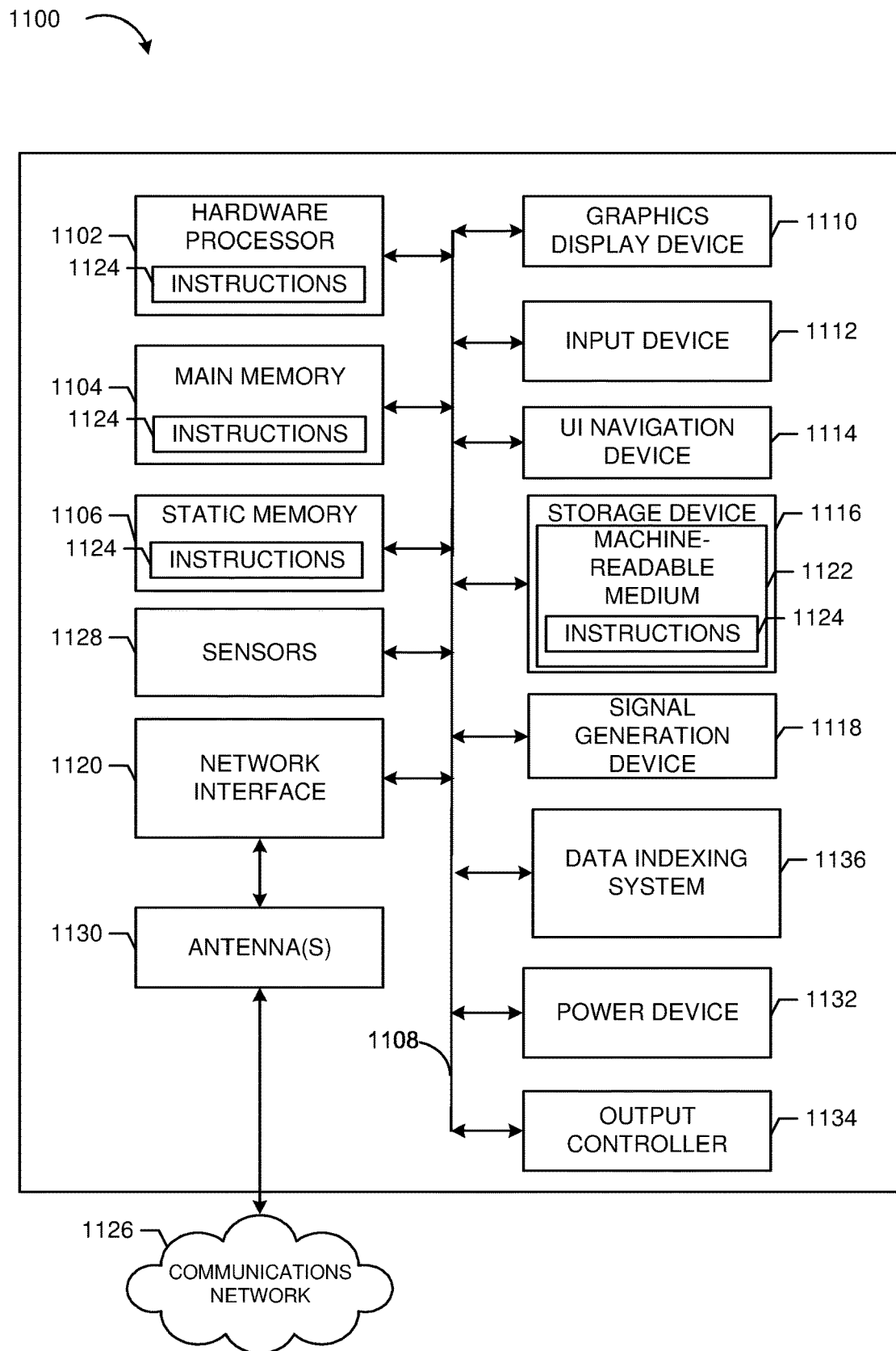
FIG. 11 illustrates a block diagram of an example machine upon which any of one or more techniques (e.g., methods) may be performed, in accordance with one or more example embodiments of the present disclosure.

In various embodiments, components of the data indexing system 102 and/or data lake 104 may be implemented using any suitable set number and configuration of computing devices, any of which may be implemented by the example computing device illustrated in FIG. 11. In some embodiments, the computing devices may be located in any suitable number of data centers or geographical locations. In various embodiments, at least some of the functionality of the data indexing system 102 may be provided by the same computing device or by different computing devices. In various embodiments, if any of the components of the data indexing system 102 are implemented using different computing devices, then the components and their respective computing devices may be communicatively coupled, e.g., via one or more networks. Any of the components of the data indexing system 102 may represent any combination of software and hardware usable to perform their respective functions. In some embodiments, operations implemented by the data indexing system 102 may be performed automatically, e.g., without a need for user initiation or user intervention after an initial configuration stage, and/or programmatically, e.g., by execution of program instructions on at least one computing device. In some embodiments, the data indexing system 102 may include additional components not shown, fewer components than shown, or different combinations, configurations, or quantities of the components shown.

Clients of the data indexing system 102 may represent external devices, systems, or entities. Client devices may be managed or owned by one or more clients of the data indexing system 102 and/or data lake 104. In one embodiment, the client devices may be implemented using any suitable number and configuration of computing devices, any of which may be implemented by the example computing device illustrated in FIG. 11. Clients may convey network-based service requests to the data indexing system 102 via one or more networks, e.g., to submit queries to be processed using Bloom filters 108. The network(s) may encompass any suitable combination of networking hardware and protocols necessary to establish network-based communications between client devices and the data indexing system 102. For example, the network(s) may generally encompass the various telecommunications networks and service providers that collectively implement the Internet. In one embodiment, the network(s) may also include private networks such as local area networks (LANs) or wide area networks (WANs) as well as public or private wireless networks. For example, both a given client device and the data indexing system 102 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the data indexing system 102. In one embodiment, client devices may communicate with the data indexing system 102 using a private network rather than the public Internet. In various embodiments, the various components of the data indexing system 102 may also communicate with other components of the database using one or more network interconnects.

Figure 2:
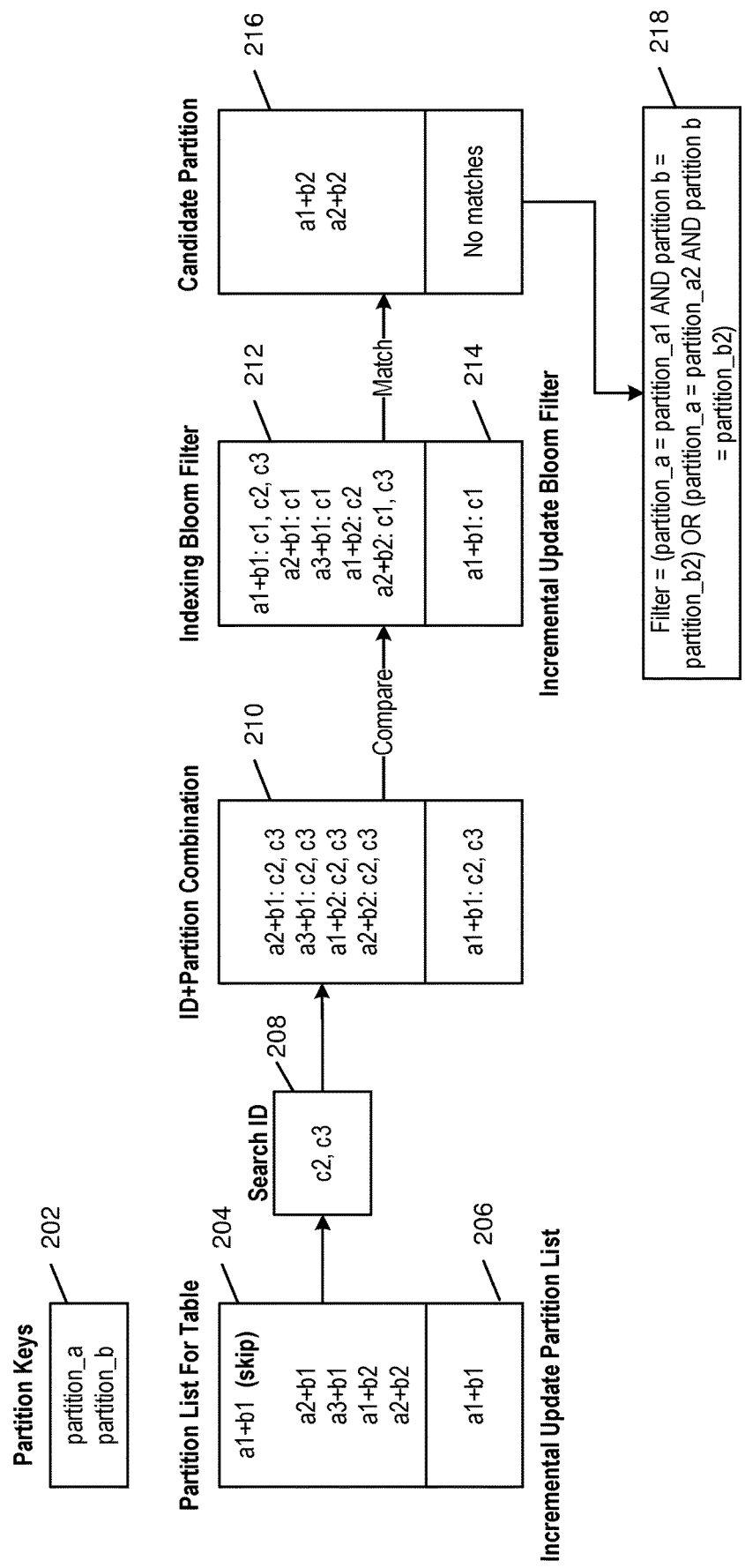
FIG. 2 illustrates an example of a diagram of an incremental index update, according to at least one embodiment.

FIG. 2 illustrates an example of a diagram 200 of an incremental index update, according to at least one embodiment. In at least one embodiment, a query or search may be implemented in the context of FIG. 2. FIG. 2 may be implemented using one or more computer systems, such as a machine described in connection with FIG. 11. In at least one embodiment, a candidate partition identification component described in connection with FIG. 1 determines a filter to perform efficient querying using Bloom filters.

Partition keys 202 may refer to a type of primary key for a collection of data, which may be stored as a table. A partition key may be a value that is used as an input to a hash function or any other suitable one-way function that produces an output which corresponds to a partition in which an item with the partition key is to or will be stored. As described in this disclosure, each partition may refer to different physical data storage devices or collections thereof. Partition keys may be unique such that no two items can have the same partition key value. In some cases, a partition key and sort key form a composite primary key such that the partition key of two items can be the same if the sort keys are different—in other words, each partition key and sort key pair in a partition is unique. Items in a partition may be stored in a sorted order based on the sort key. As shown in FIG. 2 and for illustrative purposes, two partitions keys partition_a and partition_b are depicted and used to describe how a filter for a query is generated.

Partition list for table 204 shown in FIG. 2 refers to a list of partition combinations that are available in a distributed system, in accordance with at least one embodiment. When performing a search for a value such as an identifier, each partition combination needs to be scanned, unless there is additional information that can be used to determine that a particular partition combination is irrelevant. Scanning a partition may involve loading and scanning through each item (e.g., of a table) stored in the partition and applying a filter to each item of the table. In some cases, a scan operation sequentially accesses each item in a data set. In some cases, different segments of the data set are scanned in parallel. A scan may return any items or item attributes that match a particular filter expression. In FIG. 2, partition list for table 204 illustrates five different partition combinations—a1+b1, a2+b1, a3+b1, a1+b2, and a2+b2. In at least one embodiment, indexing Bloom filters are generated for each partition combination at a first point in time by performing a brute force scan of the entire table across all partitions to generate indexing Bloom filters for each of the partition combinations; at a second point in time after the first, an incremental update Bloom filter may be created to reflect changes made to a partition combination after the indexing Bloom filters were generated. When an incremental update Bloom filter is generated for a partition, the partition combination may be added to incremental update partition list 206. If a partition combination is found in incremental update partition list, it may be skipped from partition list for table 204. For example, FIG. 2 illustrates how partition combination a1+b1 is found in incremental update partition list 206 and skipped from partition list for table 204.

Search ID 208 may refer to an identifier being searched for. Clients may submit searches for any suitable value of any suitable field. For example, a client may search for customer identifiers c2 and c3 of a table that spans multiple physical partitions. FIG. 2 illustrates an example where IDs c2 and c3 are being searched for (e.g., as part of a query submitted by a client of a computing resource service provider).

ID+partition combination 210 refers to a combination of search ID 208 with either partition list for table 204 or incremental update partition list 206. In some embodiments, ID+partition combination 210 includes a mapping of partition combinations to search identifiers. As shown in FIG. 2, the partition combination a1+b1 is skipped from partition list for table 204 because the same partition combination was found in incremental update partition list 206.

Indexing Bloom filter 212 may refer to one or more indexing Bloom filters such as those discussed in connection with FIG. 1, FIG. 7, and elsewhere in this disclosure. Indexing Bloom filters 212 may have been previously generated at an earlier point in time to reflect the state of a table across multiple partitions at a specific point in time. FIG. 2 shows an illustrative example of Bloom filters for five partition combinations with corresponding identifiers in each of the partition combinations. Indexing Bloom filters may be generated to reflect the state of the data set at a point in time by scanning a partition and, for each item scanned, computing a hash over a field value, and then setting a bit at a location corresponding to the output of the hash. This process may be performed for each partition and/or for multiple fields. A client may specify which fields to generate Bloom filters for, which can then be used to subsequently query all items in the data set with a particular field value.

For example, at a first point in time $t_0$, a serverless compute job may be scheduled to perform a brute force scan of each partition combination and create an initial Bloom filter for each of the partition combinations shown in FIG. 2. Continuing with this example, for a first partition combination a1+b1, the customer ID for each item in the partition may be hashed to determine the Bloom filter positions to set. As shown in FIG. 2, partition a1+b1 may, for illustrative purposes, include three items with customer IDs c1, c2, and c3 respectively. Identifier c1 may be hashed to produce a first hash value h1 that corresponds to a first position in the initial Bloom filter to set or increment, identifier c2 may be hashed to produce a second hash value h2 that corresponds to a second position in the initial Bloom filter to set or increment, and so on. In various embodiments, there is a non-zero probability that the values h1 and h2 are equal. Likewise, for a second partition combination a2+b1, there may be only a single item with customer identifier c1, and the initial Bloom filter is generated by hashing the identifier to determine a position of the Bloom filter of a2+b1 to set or increment. This process may be repeated (e.g., in parallel across a distributed processing framework) for each partition combination to produce an indexing Bloom filter for each partition combination.

Incremental update Bloom filter 214 may refer to one or more Bloom filters that are generated to reflect changes to a partition combination after the initial Bloom filters are generated. For example, in FIG. 2, at a time $t_1$ after $t_0$, additional changes may be applied to a partition combination, such as deletions of two items in partition a1+b1 that remove items corresponding to identifiers c2 and c3 from the partition. An incremental update Bloom filter can be created in response to changes to a partition, such as updates and deletes, whereas creation of new items may be handled by updating the indexing Bloom filter.

In some embodiments, changes to the contents of a data set in a partition causes an update job to be scheduled or executed. A job may refer to an application, task, workflow, etc. that causes execution of computer-readable code. The job may be executed using a distributed processing framework such as Spark. Various types of processing resources, such as compute instances and scalable MapReduce clusters can be utilized to execute a job. In some cases, when changes are applied to a partition, a job is submitted to a queue and then processed by a distributed processing framework based on priority, availability of resources, and other consideration. In some cases, the job is scheduled for execution on a periodic basis, such as daily, weekly, monthly, etc. and can be used to ensure that the Bloom filters used to identify candidate partitions is accurate.

An update job may be executed and generate an incremental update Bloom filter that reflects an updated state of a partition, such as in response to the update and/or deletion of items from a data set in the partition. In some cases, the partition is scanned to construct an incremental update Bloom filter based on the updated state of the data set. For example, in FIG. 2, when items corresponding to c2 and c3 are deleted from partition combination a1+b1, these changes may cause an update job to be scheduled on a distributed processing framework. The update job may be queued and then selected for execution, and then executed to scan partition a1+b1 and generate an incremental update Bloom filter that reflects the updated state of the partition. In FIG. 2, only item c1 may remain after deletion of items c2 and c3, and incremental update Bloom filter 214 may have a bit set for the Bloom filter position of item c1 and all other bits of the Bloom filter not set.

Candidate partitions 216 may be computed, selected, identified, or otherwise determined using ID+partition combination 210, indexing Bloom filter 212, and incremental update Bloom filters 214. The values or identifiers searched for in each partition may be used to query corresponding indexing Bloom filters and incremental update Bloom filters 214. If a partition has an incremental update Bloom filter, it may be used in place of the corresponding indexing Bloom filter for that partition. In at least some embodiments, a candidate partition identification component queries the Bloom filters and determines whether some or all of the partitions are candidate partitions which can possibly have a value being queried for. The candidate partitions 216 may be used to generate a filter 218 identifying specific partition combinations that are scanned to determine whether the specific partition combinations include the queried values. Filter 218 can be utilized to improve the execution of queries, for example, by utilizing filter 218 to replace a query over an entire data set with an updated query that is filtered upon the set of candidate partitions to exclude non-candidate and therefore non-relevant partitions from being scanned.

Figure 3:
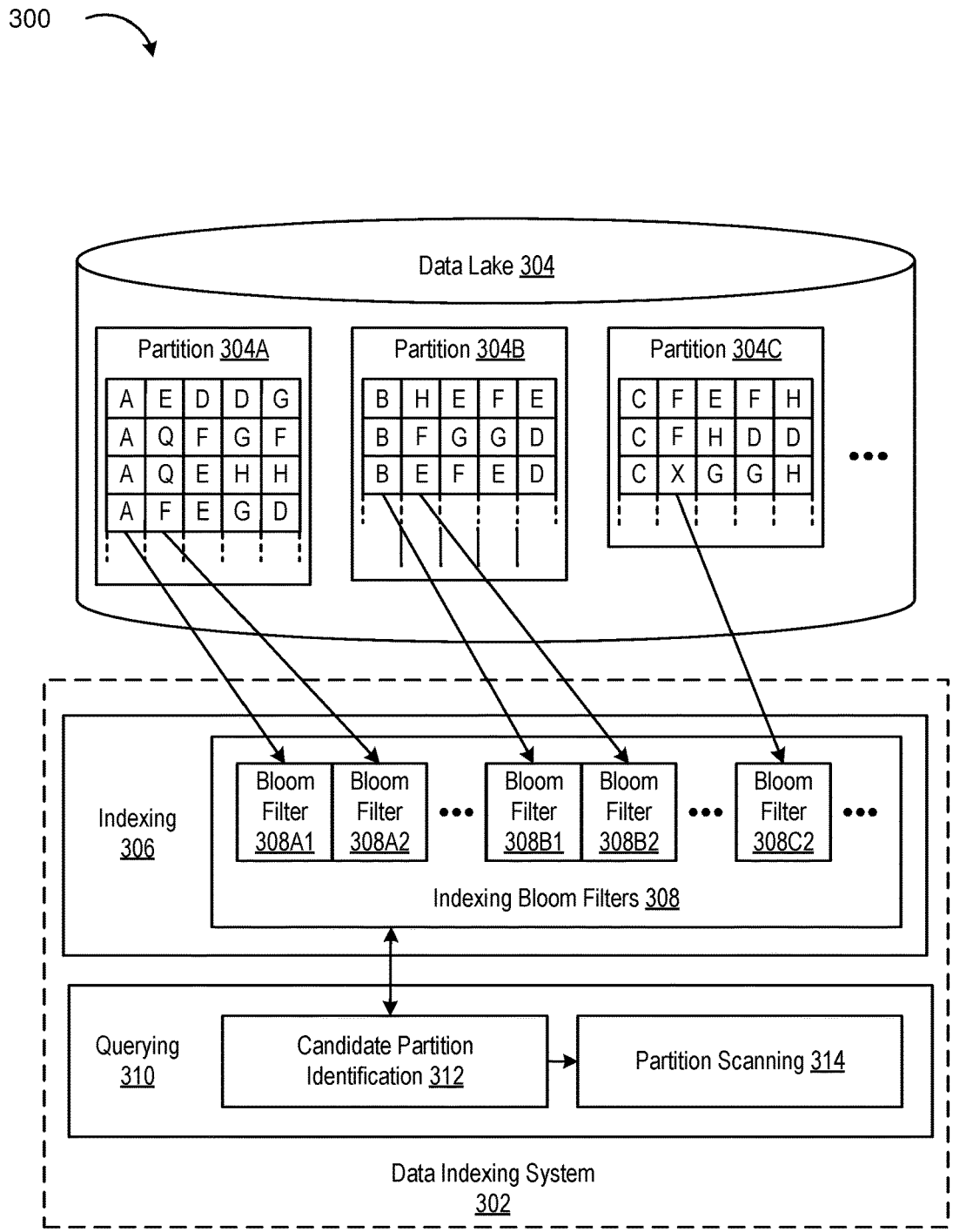
FIG. 3 illustrates an example of a computing environment in which indexing Bloom filters can be generated, according to at least one embodiment.
Figure 4:
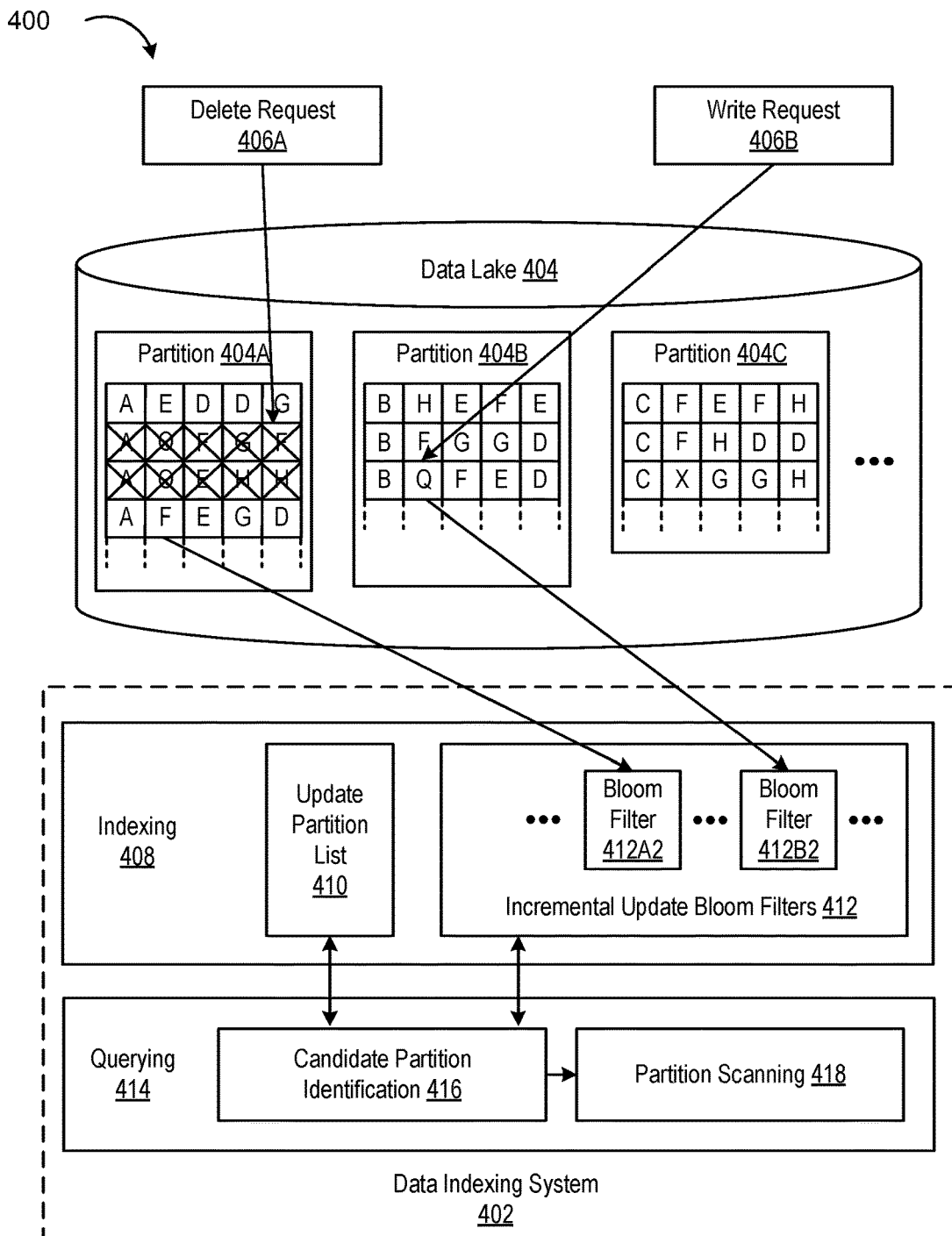
FIG. 4 illustrates an example of a computing environment in which incremental update Bloom filters are generated, according to at least one embodiment.
Figure 5:
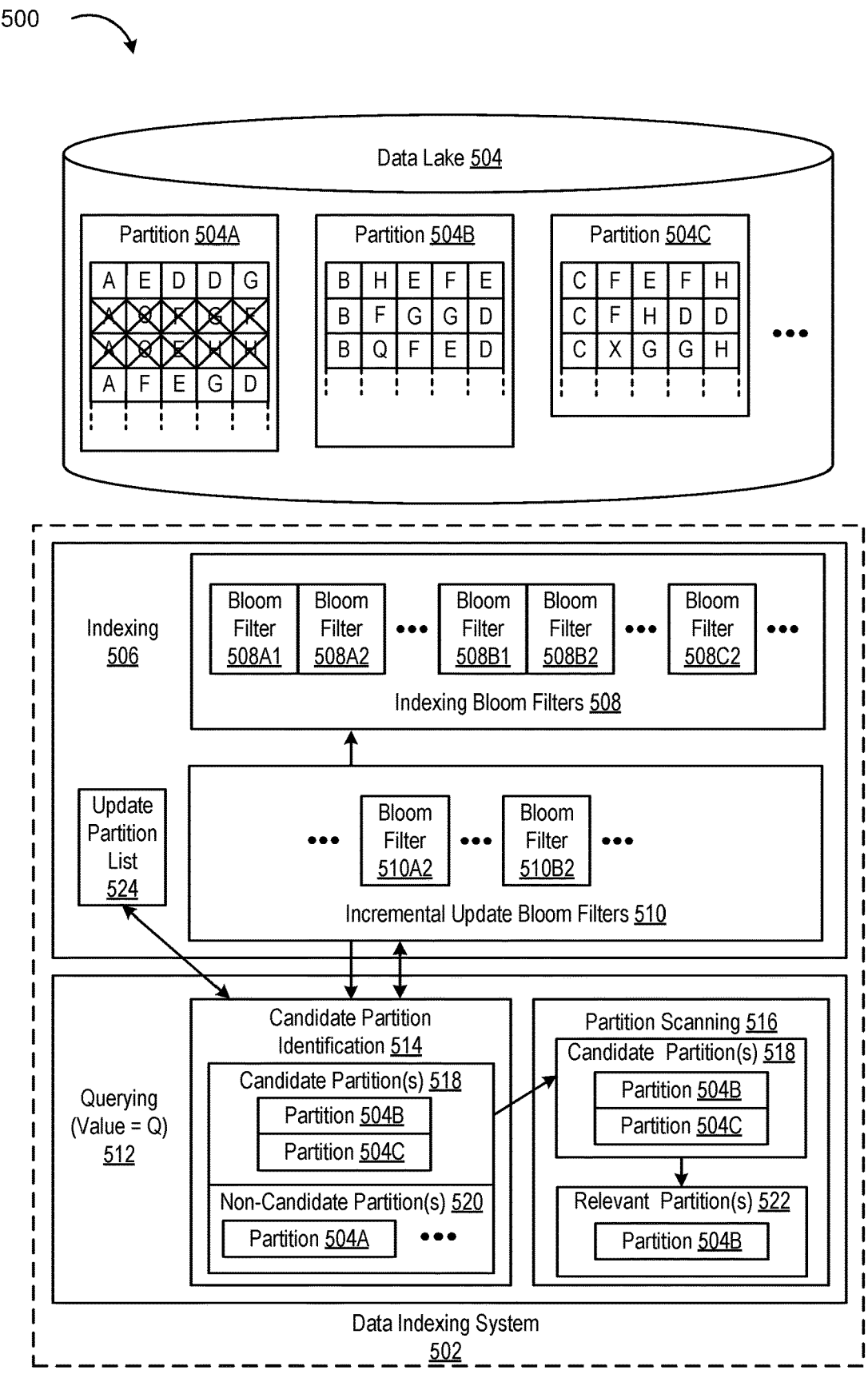
FIG. 5 illustrates an example of a computing environment in which a query is processed using Bloom filters, according to at least one embodiment.

FIGS. 3-5 may illustrate how incremental updates to a data lake can be handled using incremental update Bloom filters. FIG. 3 illustrates the state of a data lake at a first point in time, FIG. 4 illustrates the same data lake at a second point in time after the first point where changes have been applied to the data set, and FIG. 5 illustrates how a query is processed using incremental update Bloom filters, according to at least one embodiment.

FIG. 3 illustrates an example of a computing environment 300 in which indexing Bloom filters can be generated, according to at least one embodiment. In at least one embodiment, FIG. 3 illustrates a data indexing system 302 and data lake 304. Data lake 304 may comprise a plurality of partitions stored across a plurality of physical data storage devices. Data indexing system may comprise an indexing component 306 that stores or otherwise has access to indexing Bloom filters 308 and querying component 310 that further comprises a candidate partition identification 312 component and partition scanning component 314. FIG. 3 may be implemented in the context of various embodiments described throughout this disclosure, such as those described in connection with FIG. 1, FIG. 2, FIG. 7, and FIG. 11, among others.

Data lake 304 may be in accordance with those described elsewhere in this disclosure. Data lake 304 may be organized into a plurality of partitions located across several physical data storage devices, which may be located in the same or different geographical locations. Partitions such as partition 304A, partition 304B, partition 304C, etc. illustrated in FIG. 3 can be organized into a data table organized in rows and columns, records and fields, etc. For example, a record of partition 304A may have field values A, E, D, D, G, and so on. Data may be stored in partitions based on a partition key—for example, the leftmost field of the partitions shown in data lake 304 may be a partition key so that if another record has a value of "A" for that field, it will be stored in partition 304A, but if it has a value of "C" it will be stored in partition 304C.

Data indexing system 302 may be implemented using hardware, software, or a combination thereof. Data indexing system 302 may include an indexing component 306 and querying component 310. Indexing Bloom filters 308 may be stored in or otherwise accessed by indexing component 306. Indexing Bloom filters 308 may be generated by scanning each partition of data lake 304 and creating Bloom filters for one or more fields. As shown in FIG. 3, Bloom filter 308A1 is generated for a first field of a first partition 304A and Bloom filter 308A2 is generated for a second field of the first partition 304A. Likewise, Bloom filters for the same fields may be generated for a second partition 304B, and so on.

As shown in FIG. 3, Bloom filter 308A2 may be generated by reading the field value "E" from the first row of partition 304A, hashing the field value to identify a position of the Bloom filter 308A2, and setting a bit. A set bit indicates that a value that hashes to the position exists in the data set, whereas a bit that is not set indicates that there are definitely no values in the data set that hash to that position. In at least one embodiment, if a bit is already set at a location in the Bloom filter, no change to the Bloom filter is needed. For example, the second record of partition 304A may set a bit for Bloom filter 308A2 for the second field based on the value "Q" at the second field, and then when the third record is processed, it also has a value "Q" in the second field, and will not affect Bloom filter 308A2 for the second field since the bit is already set. A bit can be in a "set" or "not set" position, which can be represented by any suitable Boolean, Integer, String, etc. value so that one or more values are deterministically associated with the "set" position and one or more other values are deterministically associated with the "not set" position. As a non-limiting illustrative example, the Boolean value TRUE may be associated with a "set" position and FALSE is associated with a "not set" or "unset" position. As a second example, any non-zero integer value may be associated with the set position and only the zero value indicates not set.

Querying component 310 may include candidate partition identification component 312 and partition scanning component 314, which may be in accordance with those described elsewhere in this disclosure. In various embodiments, as long as the contents of data lake 304 are unchanged, indexing Bloom filters 308 can be used to identify candidate partitions without the use of incremental update Bloom filters.

FIG. 4 illustrates an example of a computing environment 400 in which incremental update Bloom filters are generated, according to at least one embodiment. According to at least one embodiment, FIG. 4 relates to FIG. 3 and illustrates the same data lake at a subsequent point in time after a set of changes are applied to data stored in the data lake. Accordingly, various components such as data indexing system 402, data lake 404 may be in accordance with those described in FIG. 3. For example, partition 404C may be in the same state as it was in FIG. 3 based on the absence of any changes, whereas other partitions 404A and 404B may be in a different state due to write and delete requests that were applied to those partitions subsequent to generation of indexing Bloom filters.

Incremental update Bloom filters 412 may be generated based on changes applied to partitions of a data lake subsequent to generation of one or more indexing Bloom filters such as those described in connection with FIG. 3—such indexing Bloom filters are not illustrated in FIG. 4 but may be stored in and/or otherwise accessible by indexing component 408.

The contents of data lake 404 may change at a point in time after which indexing Bloom filters are generated. For example, indexing Bloom filters may be generated for partitions 404A and 404B at a point in time to and then, a time $t_1$ subsequent to time $t_0$, a delete request 406A may be submitted to delete data stored in partition 404A. Likewise, write request 406B illustrated in FIG. 4 may add data to partition 404B at time $t_1$. Delete request 406A and write request 406B do not necessarily need to be submitted and/or processed together, but rather, FIG. 4 illustrates how changes applied at any point subsequent to generation of an indexing Bloom filter can be used to generate incremental update Bloom filters 412. Deletion of data may cause one or more bits of an incremental update Bloom filter to be not set, whereas the corresponding bit in the corresponding indexing Bloom filter may be set. As a result, generation and use of the incremental update Bloom filter 412A2 can result in partition 404A being identified as a non-candidate partition based on the deletion of data subsequent to the initial indexing of data lake 404. For example, if the two deleted records are the only records with a "Q" value and no other values hash to the same position in the Bloom filter, then the incremental update Bloom filter 412A2 can be used to determine that partition 404A is a non-candidate partition when querying for records with the value "Q".

As shown in FIG. 4, delete request 406A may be used to delete data from data lake 404. For example, delete request 406A may delete the two records of partition 404A with "Q" in the second field, which may cause an incremental update Bloom filter to be built to reflect the updated state of partition 404A. Deletion request 406A may trigger or otherwise cause an incremental update Bloom filter to be created for the partition(s) where data is affected. For example, the deletion of the two records in partition 404A may cause an update job to be submitted and executed and incremental update Bloom filter 412A2 may be generated as a result of the update job being executed. An update job in this context may refer to an incremental update to the Bloom filter of a partition based on changes subsequent to an initial indexing job. When incremental update Bloom filter 412A2 is created, the partition 404A may be added to update partition list 410.

As shown in FIG. 4, write request 406B may be used to modify or change data in data lake 404. As shown in FIG. 3 and then FIG. 4, the value of a record in partition 404B may be changed from "E" to "Q" at some point after creation of the indexing Bloom filter for partition 404B. Updates to existing data in a data lake 404 can have the effect of setting a first bit in a Bloom filter and/or unsetting a second bit of the Bloom filter. Accordingly, write request 406B may cause incremental update Bloom filter 412B2 to be created and may differ from the initial indexing Bloom filter in either two positions, one position, or zero positions, depending on what other data is stored in partition 404B. For example, partition 404B may have been previously considered a non-candidate partition for a "Q" query based on the contents of indexing Bloom filter 308B2 but is a candidate partition based on the corresponding incremental update Bloom filter 412B2.

In some cases, a write request may change one field but not another, which may cause granular updating of the Bloom filters of a partition. For example, if a write request does not change any values for a first field of a partition, then the indexing Bloom filter for that field may continue to be valid, whereas if another field of that partition is modified, then an incremental update Bloom filter may be generated for that second field but not the first field. Accordingly, update partition list 410 may, in at least one embodiment, include granular information that indicates which specific indices of a partition have been incrementally updated.

Requests to add new data (e.g., add a new record) to data lake 404 may be processed using various techniques. As the addition of new data can only set—and never unset—a bit set in a Bloom filter, an indexing Bloom filter generated at time $t_0$ may be updated to reflect the state at time $t_1$ after one or more records are added by setting additional bits based on the new records being added. Accordingly, in some embodiments, if the only changes to a partition are the addition of new records, those changes can be accommodated by directly setting additional bits (if appropriate) in an indexing Bloom filter. In some cases, additional metadata is stored to indicate when a Bloom filter was created or updated and may indicate a point in time which the Bloom filter is/was considered valid. In some embodiments, adding new records is treated similarly to deleting existing records by running an update job and generating an incremental update Bloom filter that reflects the updated state of the partition.

Querying component 414 may include candidate partition identification component 416 and partition scanning component 418 which may be in accordance with those described elsewhere in this disclosure. In various embodiments, as long as the contents of data lake 404 are unchanged, and a combination of indexing Bloom filters (not illustrated in FIG. 4) and incremental update Bloom filters 412 can be used to identify candidate partitions as part of processing a query, querying component 414 can be utilized to perform efficient querying. Incremental update Bloom filters 412 can be utilized to more efficiently perform partition scanning by identifying non-candidate partitions and reduce the number of partitions scanned to fulfill a query. Techniques described in connection with FIG. 5 may be utilized to perform queries based on the state of data lake 404 shown in FIG. 4 after changes—such as delete request 406A and write request 406B—have been applied to data lake 404 subsequent to generation of an initial set of indexing Bloom filters.

FIG. 5 illustrates an example of a computing environment 500 in which a query is processed, according to at least one embodiment. In at least one embodiment, FIG. 5 relates to FIG. 4 and illustrates how to perform a query using indexing Bloom filters 508, incremental update Bloom filters 510, and update partition list 524. Accordingly, various components such as data indexing system 502, data lake 504 may be in accordance with those described in FIG. 3 and/or FIG. 4. For example, partition 504A, partition 504B, and partition 504C may be the same or substantially similar to their counterparts described in FIG. 4. Similarly, indexing Bloom filters 508 may be generated according to FIG. 3, and incremental update Bloom filters 510 and update partition list 524 may be generated according to FIG. 4. Techniques described in connection with FIG. 1, FIG. 2, FIG. 7, and FIG. 11 may be utilized in connection with FIG. 5 to perform a query.

Data indexing system 502 may receive a request to query for a value "Q" as shown in FIG. 5. The request may be submitted as a web service API request that is routed to data indexing system 502 from one or more frontend servers. Querying component 512 may utilize indexing component to identify one or more partitions of data lake 504 which are to be scanned as part of fulfilling the query request.

Candidate partition identification component 514 may utilize indexing Bloom filters 508, incremental update Bloom filters 510, and update partition list 524 to identify a set of candidate partitions 518. For example, a query for value "Q" may be received and may be for a specific indexed field. Candidate partition identification component 514 may use the update partition list 524 to identify a set of indexing Bloom filters 508 and a set of incremental update Bloom filters 510 to use to identify candidate partitions. It should be noted that sets, in this context, may include empty sets, such as in the case where none or all of the partitions of data lake 504 have been updated after initial indexing. Continuing, once a Bloom filter (either an indexing Bloom filter or incremental update Bloom filter) has been determined for each partition, each partition is tested to determine whether it is a candidate partition or non-candidate partition. The value being queried (e.g., "Q" in FIG. 5) is hashed to determine a Bloom filter position associated with the value being queried. If a bit for the position associated with the value being queried is set in the Bloom filter for a partition, that partition is a candidate partition; if the bit is not set, then the partition is a non-candidate partition. While a bit is used in this example, counters, integers, and the like may be used to determine set and not set states of a Bloom filter.

In some cases, a Bloom filter for a partition or partition index may be unavailable—for example, there may be some embodiments where a change is applied to data lake 504 (e.g., as indicated by a change tracking log) but the corresponding incremental update job has not yet been executed when a query is submitted; in another example, one or more Bloom filters may have been corrupted, deleted, or lost; in another example, one or more jobs to generate Bloom filters failed, which could be due to transient errors (e.g., insufficient computing resources at time of execution), bugs in code, and so on. These are non-limiting and illustrative examples in which a Bloom filter may be missing. In some embodiments, if a Bloom filter for a partition is missing, that partition is automatically categorized as a candidate partition and will be scanned as part of a query. It should be furthermore noted that if an incremental update Bloom filter for a partition is expected but missing, that the corresponding indexing Bloom filter may not be an appropriate substitute, as the indexing Bloom filter may be invalid or out-of-date based on subsequent changes applied to the partition. For example, if indexing Bloom filter 508B2 (generated in accordance with the state of the data lake in FIG. 3) were used in place of Bloom filter 510B2, it would erroneously identify partition 504B as a non-candidate partition. Accordingly, and based on the techniques described above, if Bloom filter 510B2 were accidentally deleted or otherwise inaccessible at query time, partition 504B would be categorized as a candidate partition based on the partition being in update partition list 524 and the incremental update Bloom filter being missing.

As shown in FIG. 5, candidate partitions 518 and non-candidate partitions 520 may be identified. Candidate partitions 518 may be identified based on a determination that the Bloom filter of a partition indicates that the value being queried might be in the partition, and non-candidate partitions 520 may be identified based on a determination that the Bloom filter of a partition indicates that the value being queried is definitely not in the partition. A set of candidate partitions 518 may be provided to partition scanning component 516. In some embodiments, partition scanning component 516 creates a filter based on candidate partition which identifies a set of partitions to scan. In at least one embodiment, each candidate partition is scanned to determine whether it includes the query value. If the query value is found in a candidate partition, then that partition is a relevant partition 522. As illustrated in FIG. 5, partition 504B may be a relevant partition because it has a "Q" value which is being queried for, but partition 504C is a false positive due to the value "X" also hashing to the same position as "Q" in the Bloom filter.

Figure 6:
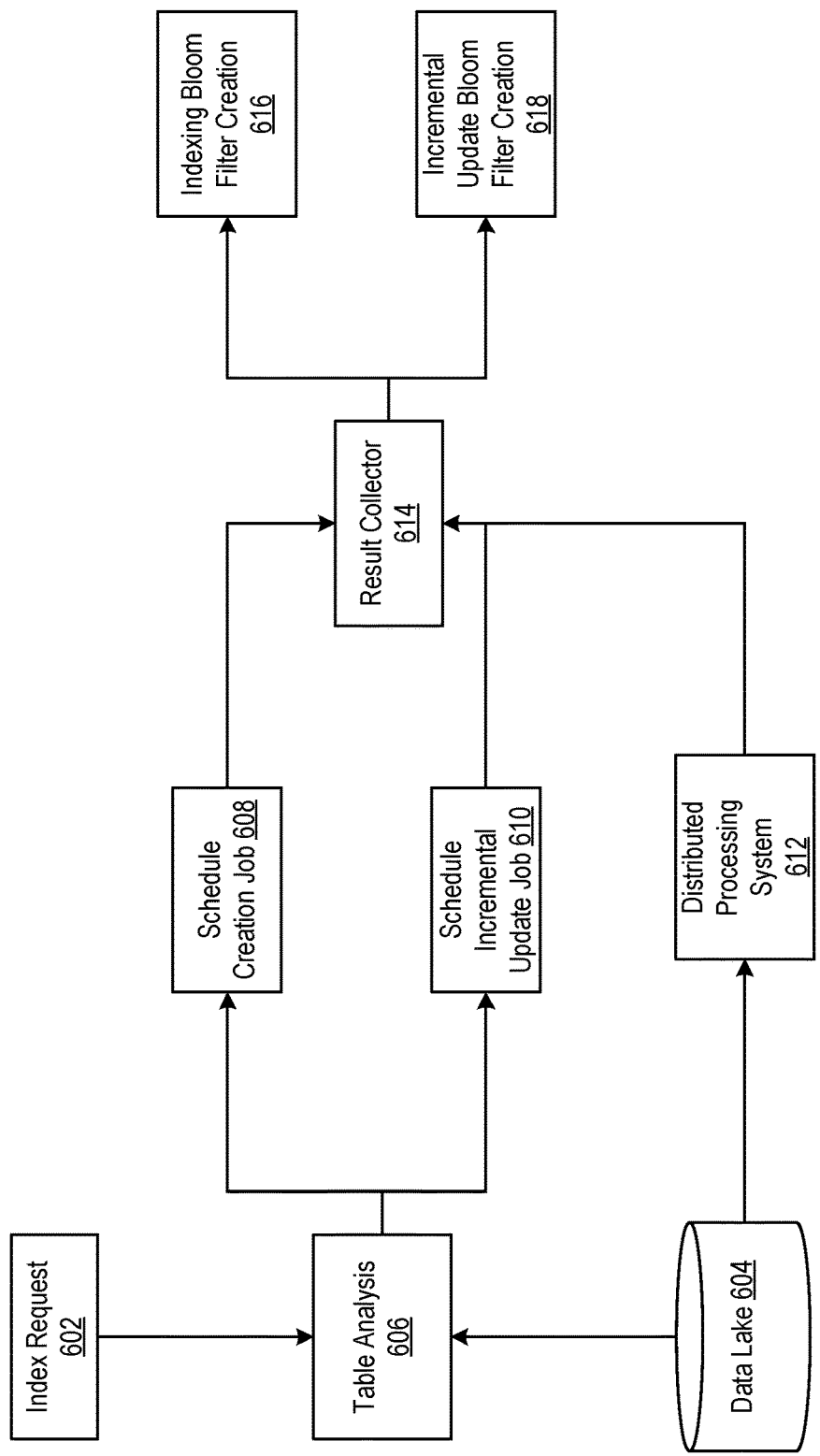
FIG. 6 illustrates an example of a computing environment for generating Bloom filters for indexing partitions of a data lake, according to at least one embodiment.

FIG. 6 illustrates an example of a computing environment 600 for generating Bloom filters for indexing partitions of a data lake, according to at least one embodiment. In some embodiments, an index request 602 is used to initiate a workflow for creating Bloom filters. Index request 602 may be a web service API request that specifies a data lake 604 to build Bloom filters for. As part of fulfilling an index request, table analysis 606 may be performed on data lake 604 to determine how data lake 604 is organized—for example, by identifying a set of partitions which are used to store data for the data lake. While data lakes are described throughout this disclosure, various types of distributed data stores such Hadoop Distributed File System (HDFS) can be utilized to practice various techniques described throughout this disclosure. For an initial indexing request, all partitions may be identified for Bloom filter creation; for incremental indexing, a change log may be scanned to determine which partitions have been modified subsequent to creation of the most recent Bloom filter for the partition.

In at least one embodiment, a job may be scheduled after performing table analysis. Examples of different types of jobs that can be scheduled may include a schedule creation job 608 to create indexing Bloom filters and schedule incremental update job 610 to create incremental update Bloom filters. A job may encode various parameters, such as the location or identifiers for a set of partitions for which the relevant Bloom filters should be generated. Result collector 614 may coordinate the execution of jobs across available computing resources. For example, distributed processing framework 612 may utilize MapReduce clusters to execute a job in a highly parallelized manner—for example, Bloom filters for different partitions may be executed across different compute resources of the distributed processing framework 612 in a highly parallelized manner. As a result, indexing Bloom filter creation 616 is achieved via a schedule creation job 608 and incremental update Bloom filter creation 618 is achieved via a schedule incremental update job 610.

Figure 7:
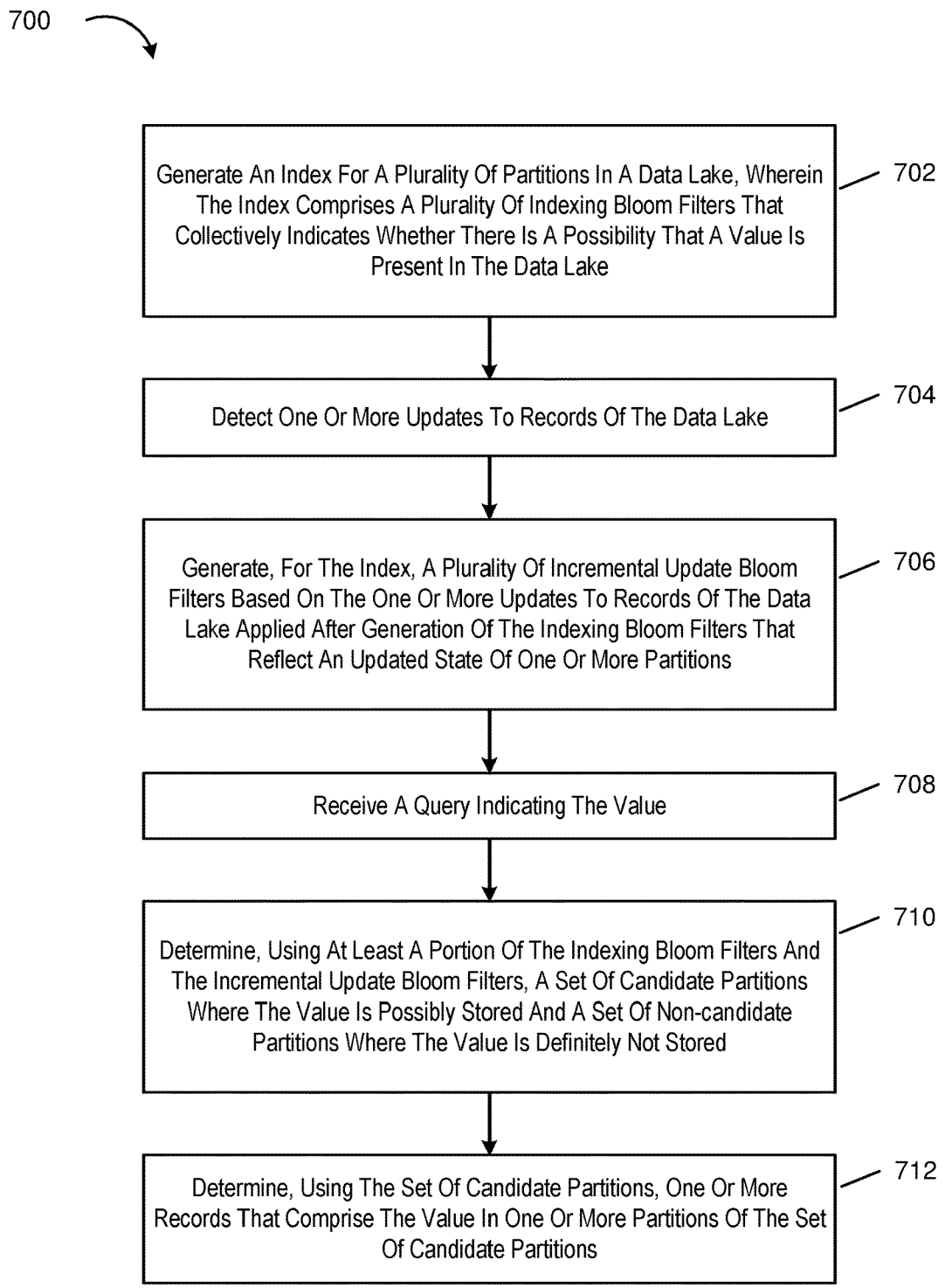
FIG. 7 shows an illustrative example of a process for incremental update of Bloom filters, in accordance with at least one embodiment.

FIG. 7 shows an illustrative example of a process 700 for incremental update of Bloom filters, in accordance with at least one embodiment. In at least one embodiment, some or all of the process 700 (or any other processes described herein, or variations and/or combinations thereof) is performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 700 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 700 may be implemented in the context of various systems and methods described elsewhere in this disclosure, such as those discussed in connection with FIGS. 1-6 and 11. For example, process 700 can be performed by various components described in connection with FIGS. 1-6 and 11 utilizing one or more computing devices hosted and/or under the control of a computing resource service provider.

In at least one embodiment, process 700 is performed at least in part using a system that comprises or otherwise has access to a data lake. The system performing process 700 may comprise a data indexing system that comprises one or more processors and one or more memories storing computer-executable instructions that, as a result of execution, cause the one or more processors to perform one or more steps of process 700. In some embodiments, a first component of the system causes a second component of the system to perform a step of process 700.

In various embodiments, process 700 comprises a step to generate 702 an index for a plurality of partitions in a data lake, wherein the index comprises a plurality of indexing Bloom filters that collectively indicates whether there is a possibility that a value is present in the data lake. The plurality of indexing Bloom filters may be in accordance with indexing Bloom filters described throughout this disclosure, as those discussed in connection with FIGS. 1-6. The data lake may comprise a distributed object store or distributed set of object stores that store objects such as records, as described in detail elsewhere in this disclosure, such as in connection with FIG. 1. For example, a Bloom filter for a partition may be generated by scanning the data set of a partition, obtaining values for a first, second, etc. record of the data set being indexed, and generating Bloom filter position values for the records being indexed. The position may be generated using a field value as an input to a one-way function such as a hash function, which produces an output that corresponds to a position in the partition's Bloom filter. Once a position in a probabilistic data structure (e.g., Bloom filter) is identified, a bit or value at the position is updated—for a Bloom filter, the position is updated to a "set" position which indicates that there is a possibility that a set of values is in the partition (but not making any assurances that any particular value of the set of values is definitely in the partition) whereas an "unset" position indicates that the entire set of values is definitely not in the partition. In some embodiments, a "set" position corresponds to a Boolean TRUE value and an "unset" position corresponds to a Boolean "FALSE" value. While Bloom filters are used as illustrative examples according to FIG. 7, any suitable probabilistic data structure may be utilized, including but not limited to: any suitable Bloom filter variant, such as counting Bloom filter; quotient filter; skip list; count-min sketch, and so on. In some cases, a counter value is used to track a minimum number of instances of a set of values in a partition, such as when a counting Bloom filter is utilized. In various embodiments, a distributed processing framework is utilized in the execution of an initial indexing Bloom filter creation job, for example, by utilizing techniques described in connection with FIG. 6. In various embodiments, an indexing Bloom filter is generated for each partition of a data lake and reflects the state of the data lake at an initial point in time to.

In various embodiments, process 700 comprises a step to detect 704 one or more updates to records of the data lake. In some embodiments, metadata is recorded when changes to records of a data lake are applied. The metadata may indicate which records changed, what the previous and/or updated values of the record are, and so on. In some cases, changes are detected when data of a partition is loaded. In various embodiments, additions of new data or records to a partition are handled by directly updating the partition's indexing Bloom filter and a timestamp is updated to indicate that the indexing Bloom filter reflects the additional data that was added to a partition after time to. In various embodiments, incremental update Bloom filters are created and/or updated based on changes to or deletions of data that was stored at time to.

In various embodiments, process 700 comprises a step to generate 706, for the index, a plurality of incremental update Bloom filters based on the one or more updates to records of the data lake applied after generation of the indexing Bloom filters that reflect an updated state of one or more partitions. When a change to a data lake is detected, the change may be inspected to determine whether to perform an incremental update. For example, if data in an indexed field of a partition is deleted, it may cause the partition's indexing Bloom filter to produce false positives. When a change (e.g., update to or deletion of data in an indexed field) is detected, an incremental update job may be submitted for the partition to generate an incremental update Bloom filter for the partition. Techniques described in connection with FIG. 6 may be utilized to coordinate the scheduling and execution of the update job. An incremental update Bloom filter may be generated for a partition to reflect an updated state of a partition at some point in time $t_1$ after time $t_0$. Metadata associated with a Bloom filter may be utilized to determine whether the Bloom filter is up-to-date or not. For example, if metadata associated with a Bloom filter indicates that the Bloom filter reflects the state of a partition at time to but logging metadata indicates that there were subsequent updates to the partition after time to, it may be the case that an update job for the partition has been scheduled but not yet executed. In such examples, the partition may be treated as a candidate partition if there is not enough information to determine whether a value being queried for is in the partition or not and that the partition should be scanned to determine whether or not it is a relevant partition.

In various embodiments, process 700 comprises a step to receive 708 a query indicating the value. In some embodiments, a web service API request is received and indicates a requestor, which may be a client of a computing resource service provider. A query may request that the system performing process 700 return identifiers for each record in the data lake that includes a certain field value. In some embodiments, this query is used to identify protected health information (PHI), personally identifiable information (PII), or other types of sensitive data. The query may be generated based on applicable requirements such as GDPR requirements and used to locate and delete data that is subject to such requirements.

In various embodiments, process 700 comprises a step to determine 710, using at least a portion of the indexing Bloom filters and the incremental update Bloom filters, a set of candidate partitions where the value is possibly stored and a set of non-candidate partitions where the value is definitely not stored. As described elsewhere in this disclosure, such as in connection with FIG. 2, indexing Bloom filters (or a portion thereof) and incremental update Bloom filters can be used to determine a set of candidate partitions. When a value is being queried for, the applicable Bloom filter for a partition may be queried. The value may be hashed to determine a position in the applicable Bloom filter. The Bloom filter position that was computed may be inspected to determine one of two outcomes based on whether it is in a "set" or "unset" position—if it is "set" then the value could possibly be in the partition and the partition is added to a set of candidate partitions; if it is "not set" then it is definitely not in the partition and may be discarded, added to a set of non-candidate partitions, etc. This sub-process may be repeated for each partition to determine whether each partition is a candidate partition or not. In some cases, there may not be an up-to-date Bloom filter that can be queried for a partition; such a partition may be categorized as a candidate partition so that it is scanned to determine whether the queried value is included in the partition.

In various embodiments, process 700 comprises a step to determine 712, using the set of candidate partitions, one or more records that comprise the value in one or more partitions of the set of candidate partitions. Techniques described in connection with FIG. 1 and FIG. 5 and elsewhere may be utilized to determine one or more records that include the value being queried for. In at least one embodiment, each partition of the set of candidate partitions are scanned to determine whether the value is present. In some cases, a partition was added to the set of candidate partitions due to a hashing collision, resulting in a false positive for the query. For example, there is a non-zero probability that a different value from the value being queried could hash to the same Bloom filter position; if the different value were in a partition, it could result in a candidate partition being identified which is subsequently discarded (e.g., not added to the set of relevant partitions).

Variations of the process illustrated in FIG. 7 are also contemplated within the scope of this disclosure, In some embodiments, a process of this disclosure (e.g., to perform efficient queries using Bloom filters) comprises generating a first plurality of probabilistic data structures associated with a field of a plurality of records stored in a plurality of partition of a distributed data store, wherein a first probabilistic data structure of the first plurality of probabilistic data structures is associated with a partition of the distributed data store and indicates whether a value could be present in the partition, generating a second probabilistic data structure for the partition based on a change to the partition subsequent to generation of the first plurality of probabilistic data structures, including the partition in a set of candidate partitions based on the second probabilistic data structure indicating that the value could be in the partition, and fulfilling a query for the value using the set of candidate partitions. In some embodiments, fulfilling the query comprises searching for whether the value is in the partition by scanning each candidate partition for records or items that include the value being queried. In some cases, the query specifies a particular field or attribute to search for the query. In some embodiments, the method comprises detecting the change to the partition and causing a distributed processing framework to generate the second probabilistic data structure in response to the change to the partition being detected, which may utilize techniques described in connection with FIG. 6. In some embodiments, the set of candidate partitions is used to generate a filter expression. The filter expression may be used to restrict a query operation to a set of candidate partitions and not a set of non-candidate partitions, thereby avoiding unnecessary scans of the non-candidate partitions as part of fulfilling the query. A set of relevant partitions can be determined by executing query for a value that includes a filter expression that restricts the query to the candidate partitions and excludes one or more non-candidate partitions. In some embodiments, the set of candidate partitions includes one or more false positives, which can arise when a value different from the value being queried hashes to the same position in a Bloom filter—in such cases, a system may scan a candidate partition, determine that the value being queried for was not found in the candidate partition at all, and then determine that the candidate partition is not a relevant partition. Probabilistic data structure, in at least some embodiments, can be implemented using Bloom filter variant, such as counting Bloom filter; quotient filter; skip list; count-min sketch, and so on. These are non-limiting and non-exhaustive examples of different types of probabilistic data structures that can be used in connection with FIGS. 1-11. In some embodiments, incremental update Bloom filters are generated based on a software or hardware component determining that there was a change to data in a distributed data store (e.g., update to or deletion of the data).

In some embodiments, a process of this disclosure (e.g., to perform efficient queries using Bloom filters) comprises steps to identify a change to a partition of a distributed data store organized into a plurality of partitions, wherein the change is subsequent to generation of a first plurality of probabilistic data structures that indicate whether partitions of the plurality of partitions lack a value, generate a probabilistic data structure for the partition that indicates the partition, after application of the change, lacks the value, and wherein the probabilistic data structure and at least a portion of the first plurality of probabilistic data structures is usable to determine at least one partition of the distributed data store to exclude from a search for the value. In some embodiments, a system receives a query requesting a value, determines that the data of the partition changed subsequent to generation of the first plurality of probabilistic data structures, obtains the probabilistic data structure as a result of determining that the data of the partition changed, and determines, using the probabilistic data structure, that the partition is a non-candidate partition. Non-candidate partitions may be excluded from being scanned when the probabilistic data structure is able to determine that the value being queried for is definitely not in the partition. In some embodiments, the system identifies a set of candidate partitions based on the probabilistic data structure and at least a portion of the first plurality of probabilistic data structures, identify a set of non-candidate partitions based on the probabilistic data structure and at least a portion of the first plurality of probabilistic data structures, wherein the set of non-candidate partitions includes the partition, wherein the set of candidate partitions and the set of non-candidate partitions are mutually exclusive, and determines a set of relevant partitions by scanning the set of candidate partitions for the value. In some cases, such as to comply with GDPR requirements, the system may obtain a set of data objects or items from the set of relevant partitions that includes the query value and delete them. In some embodiments, instructions to identify the change to the partition of the distributed data store, as a result of being executed by the one or more processors of the computer system, cause the system to use logging metadata to determine that the change was applied to the partition subsequent to generation of the first plurality of probabilistic data structures, and the system submits an update job to a distributed processing framework to cause the probabilistic data structure to be generated, such as in the manner described in connection with FIG. 6. In some embodiments, the probabilistic data structure is a Bloom filter. In some embodiments, a first partition of the plurality of partitions is stored on a first data storage device and a second partition of the plurality of partitions is stored on a second data storage device.

As described in greater detail below, techniques described herein can be utilized to implement systems and methods to perform efficient querying of distributed data sets. Indexing techniques, such as those described above, can be utilized to more efficiently process client queries. In many scenarios, a client may submit a request to query a data set or a portion thereof. In some cases, the client is not aware of which portions of the data set may be relevant to the data set, or it may be onerous for a client to perform fine-grained analysis to determine more precise filters to apply on each query. As described in greater detail below, a data discovery service can be utilized to receive a client query and use indexing information to determine a filter that can be applied on the query to more efficiently perform the query. The filter may specify a subset of the data set that was originally specified in the client request. For example, when a client submits a query over a data set, the data set may be organized into partitions and may furthermore be indexed, such as by utilizing the techniques described above in connection with FIGS. 1-7. Rather than scanning each partition to fulfill the query, a data discovery service can utilize the available indexing information to determine a more efficient query strategy. For example, the data discovery service can identify one or more non-candidate partitions and create a filter to exclude the non-candidate partitions from being scanned. Accordingly, client queries can be executed in a more efficient manner by skipping irrelevant partitions, which reduces the amount of data that is loaded and scanned to fulfill the client request.

Figure 8:
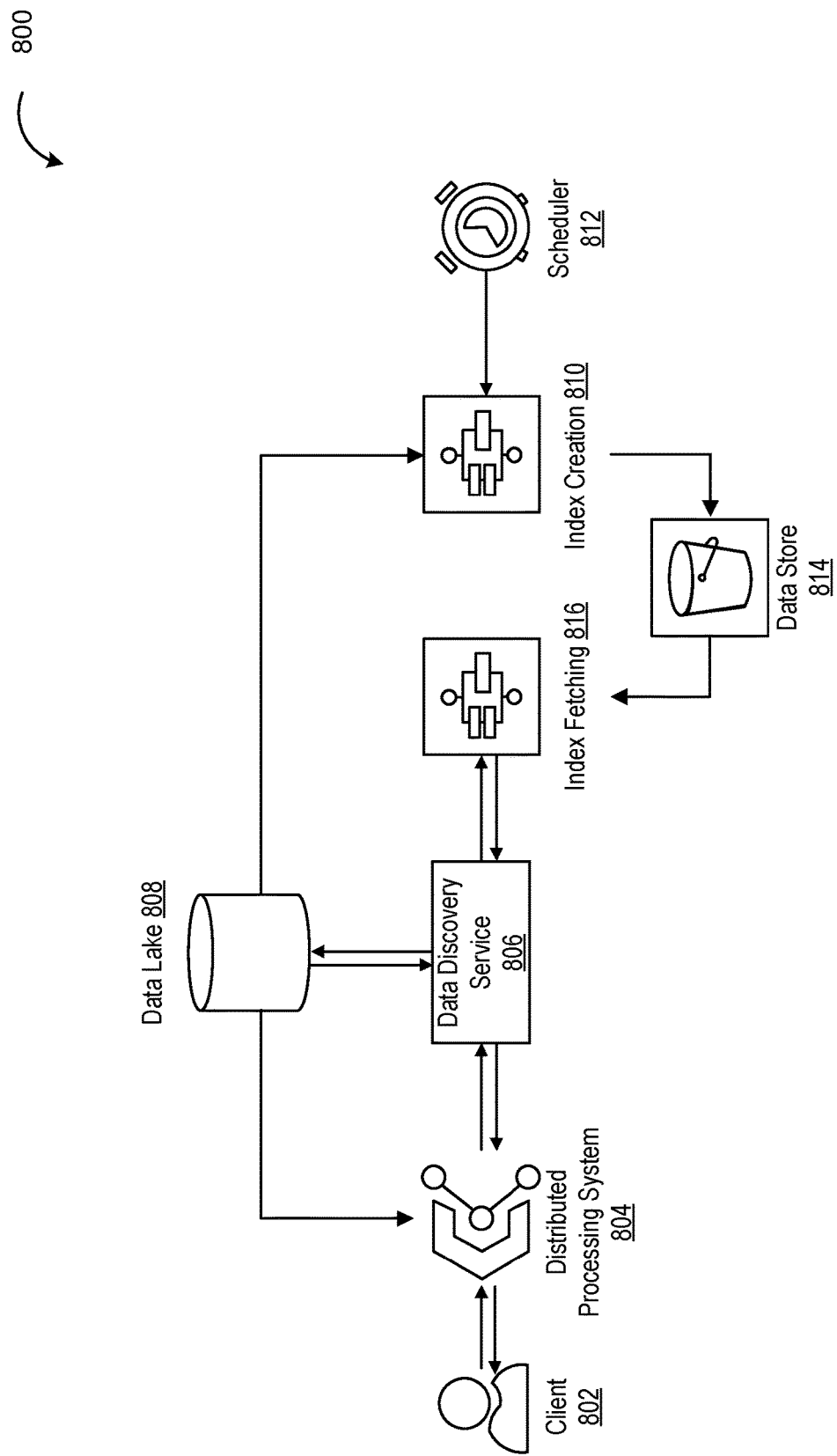
FIG. 8 illustrates an example of a computing environment for efficient querying of indexed fields, in accordance with at least one embodiment.

FIG. 8 illustrates an example of a computing environment 800 for efficient querying of indexed fields, in accordance with at least one embodiment. In various embodiments, a metadata service connects to a big data service to fetch partition information and communicate with an indexing fetching component which provides indexing information that is used to identify partitions related to a query request. Techniques described herein may be utilized to reduce the number of distributed file locations in the big data service that are provided to a distributed processing framework and reduce the amount of data loading overhead and total execution time for queries. In various embodiments, client query requests are received, analyzed, and optimized such that clients are not required to understand how the data sets being queried are stored or organized.

Client 802 may refer to any suitable client computer system or, based on context, may refer to an entity controlling a client computer system. Client 802 may be a machine implemented in accordance with FIG. 11. Client 802 may establish a client-server relationship and/or connection with a computing resource service provider and submit requests to the computing resource service provider via electronic messages. Client 802 may submit web service API requests to a computing resource service provider. As an example, client 802 may submit a request that is routed via a network to distributed processing system 804, which may be hardware and/or software controlled by a computing resource service provider that implements functionality for processing client requests.

As an example, a query request submitted by client 802 may be written according to a SQL syntax and may be a full SQL statement or may be written in the form of a SQL statement. For example, "SELECT*FROM table-name WHERE field='x'" returns all records from the specified table that meet the conditions specified in the WHERE clause. In the provided example, each row of the "table-name" table that has a value in the "field" column equal to "x" is returned. In various embodiments, client 802 submits a query for data objects that include a specified query value and techniques described below in greater detail below (e.g., in connection with FIG. 10) are utilized to efficiently process the query.

A query may be transmitted by client 802 via a network such as the Internet to a computing resource service provider front-end server that routes the request to distributed processing system 804. Distributed processing system 804 may be a platform for processing large quantities of data using distributed processing software such as Apache Spark, Apache Hive, Apache HBase, Apache Flink, Apache Hudi, Presto, and so on. Distributed processing system 804 may programmatically perform tasks such as provisioning capacity and tuning clusters. Distributed processing system 804 may be in accordance with those described elsewhere in this disclosure, such as those discussed in connection with FIG. 6. Distributed processing system 804 may be a managed cluster platform that utilizes parallel programming techniques to analyze large amounts of data in data lake 808 in a parallelized manner.

Data discovery service 806 may be implemented as hardware, software, or a combination thereof. In various embodiments, data discovery service 806 provides data consumers a way to discover, access, and analyze the contents of data lake 808. Data discovery service 806 may be a service or component thereof that extracts metadata and prepares a data catalog that allows data consumers to more efficiently search, locate, and analyze data sets of a data lake. In various embodiments, a data lake stores data objects in its native format and data discovery service generates and maintains metadata that provides technical or logical meaning to the raw data. For example, Bloom filters such as those described in connection with FIGS. 1-7 may be generated, stored, and incrementally updated as metadata. Data discovery service may generate metadata for incoming data or at a later point in time as part of an asynchronous workflow. In at least one embodiment, data discovery service 806 comprises one or more computer systems that collectively includes executable-code that, as a result of execution, evaluates partitions, index, and other information and optimizes data queries. Data discovery service may crawl data sets of the data lake; extract metadata and prepare a data catalog; provide search, sort, and filter functionality; deliver information about data sets to users; and combinations thereof.

In at least one embodiment, data discovery service 806 optimizes the use of indexes on partitioned data sets of a data lake without introducing any additional overhead to clients or external users. Data discovery service 806, in at least one embodiment, analyzes incoming client queries and updates the queries based on the available indexes for a given data set. Within the context of a distributed data lake, a metadata layer is built with indexes and which types of indexes are available on each partition is cataloged. This catalog may be used to update queries on the fly to take advantage of the best indexes that are available to each partition.

Data lake 808 may hold raw data in its native format, and may store both relational data and non-relational data. Data lake 808 may include a plurality of object stores that are stored in a distributed manner. Object stores may differ in their performance characteristics, application programming interfaces (APIs), storage architectures, and/or other attributes. Objects in one object store in the data lake 808 may represent a different structure and/or different data types than objects in another object store. Objects in the data lake 808 may include object blobs or files. Objects in the data lake 808 may include semi-structured data (e.g., CSV files, logs, XML files, JSON files, and so on). Objects in the data lake 808 may include unstructured data (e.g., e-mails, word processing documents, PDFs, and so on). Objects in the data lake 808 may include binary data (e.g., images, audio, and video). In some embodiments, data lake 808 includes objects that are not stored as structured data in tables that organize data by rows and columns. In some embodiments, at least some of the records in the data lake 808 are stored without using a schema. A schema may represent a formal definition of the structure or organization of a data store. In some embodiments, at least some of the records are stored in the data lake 808 according to a partial schema. A partial schema may partially but not completely define the structure or organization of a data store. In some embodiments, some of the records may be stored in one object store according to a partial schema that differs from others of the records in another object store.

A particular data set may be divided into partitions to improve performance, e.g., to improve the performance of data access. A very large data set may have thousands or millions of partitions potentially representing terabytes of data. For example, a data lake 808 capturing timestamped data objects may be partitioned by a field such as "day" such that data timestamped for one day is stored in a different partition than data timestamped for another day. Timestamps can be used, for example, to represent when a data object was created, when an order was created, and so on. However, a data lake 808 partitioned by date (e.g., order date) may not be partitioned by another field such as an identifier associated with the record (e.g., order number). To quickly find data in the data lake 808 for a particular identifier (or other field that was not used for partitioning), data discovery service 806 may modify client queries based on availability of one or more indexes that can identity one or more irrelevant partitions.

In various embodiments, a data lake 808 is organized into partitions. In some embodiments, a data storage service organizes partitions using a flat structure where objects are stored in buckets. In some embodiments, a hierarchy where files are stored in folders is used. In some embodiments, buckets can be used to logically organize objects in a hierarchal manner. For example, a bucket "foo/" with objects "bar.txt" and "baz.txt" may logically treat or show "foo" as a folder name and "bar.txt" and "baz.txt" as objects stored within this folder. In some cases, partitions of data are organized by an indexed field—for example, a data set can be partitioned so that each day is organized in a different subfolder "2021 Jan. 31", "2021 Jan. 30", "2021 Jan. 29" and so on such that all orders made on a specific date are located in the same subfolder.

Index creation 810 may refer to a step functions workflow that creates one or more indexes, such as those described in connection with FIG. 1-7. For example, Bloom filter indexes may be generated to identify whether a partition definitely does not include a value being queried for or may include the value being queried for. A step function may refer to a serverless function orchestrator that coordinates the execution of a sequence of functions. Functions as described herein may include event-driven functions or routines that are executed by an event-driven compute service. Serverless function orchestration may involve coordinating the execution of a series of individual serverless applications, managing retries, and debugging failures. A workflow, such as a workflow for index creation, may be described as a state machine with a set of nodes corresponding to tasks and directed edges that define how state transitions occur. The state machine may have exactly one start node corresponding to the first task that is run in a workflow. For example, a task to create a Bloom filter for a partition may have emitted an output variable indicating whether the Bloom filter for the partition was successfully created. If the variable indicates a fail code, then the task may be re-tried (e.g., up to a predefined number of times), else if the variable indicates a success error code, then the index creation task for the partition may be completed. Serverless computing, and other various terms relating to the use and/or performance of "serverless" functionality may refer to an execution model where a computing resource service provider allocates, provisions, maintains, coordinates execution of code on, and de-provisions machine resources on demand. A computing resource service provider may utilize computer servers to run serverless functions—for example, a client may specify executable code for a serverless application and the computing resource service provider may be responsible for identifying an available compute resource (e.g., a hardware server), creating a new virtual machine (VM) instance on the available resources, loading the executable code for the serverless application on the virtual machine instance, running the executable code on the allocated VM instance, emitting a result from having run the executable code, and de-provisioning the virtual machine instance so that resources for the virtual machine instance have been de-allocated and are freed for use (e.g., to run other serverless applications). Indexes created during index creation 810 may be stored in data store 814, which may be part of a metadata layer of data lake 808.

Scheduler 812 may refer to any software and/or hardware component that coordinates execution of index creation 810. For example, scheduler 812 may be a service that is used to coordinate execution of periodic index creation workflow jobs, such as on a weekly, monthly, or yearly basis. In some embodiments, index creation jobs can be invoked or scheduled manually without requiring the use of a scheduler 812. In various embodiments, index creation jobs are executed according to embodiments described in connection with FIG. 6.

Data store 814 may refer to any suitable electronic component for storing indexes and metadata generated during index creation 810. In at least one embodiment, a data storage service of a computing resource service provider is used to store the indexes and can be accessed by other workflows, such as a workflow for index fetching. In some embodiments, data store is part of a metadata store that is logically and/or physically distinct from raw data stored in a data lake 808. Any suitable data storage device or service may be utilized to implement data store 814.

Index fetching 816 may refer to a step functions workflow for fetching indexes for a plurality of partitions to identify candidate partitions. In some embodiments, data discovery service 806 receives a query request for a value (e.g., over all fields or only some fields) and data discovery service 806 uses an index fetching workflow to obtain Bloom filters for each partition of data lake 808. In some embodiments, index fetching 816 comprises tasks for fetching indexes from data store 814 for each partition. In some embodiments, a task for fetching an index for a partition emits or produces a status variable that indicates whether the index was successfully fetched. If the index was not successfully fetched (e.g., due to the status variable indicating that the index was not found) it may trigger an index creation workflow 810 to be executed. In some embodiments, index fetching 816 workflow includes fetching and/or determining at least one Bloom filter for each partition of data lake 808. According to at least one embodiment, index Bloom filters and/or incremental update Bloom filters may be fetched and returned to data discovery service 806.

In at least one embodiment, client 802 submits a query request to search a data lake 808 or portion thereof for a value and the request is routed to data discovery service 806. Data discovery service 806 may obtain available indexes via an index fetching workflow, which may be encoded as a set of Bloom filters that correspond to each partition of the data lake 808. Data discovery service 806 may determine a set of candidate partitions that could possibly have the value being queried for and update the query so that the query path includes only the candidate partitions. For example, a client may submit a query that specifies a path for a folder, which may be replaced by paths of only the subfolders which might include the value being queried for. In some embodiments, the query request is processed as a job, which is paused briefly (e.g., for a second or less) to allow for data discovery service 806 to determine subfolder paths and replace the path specified in the query request with subfolders where the value is or might be located.

Figure 9:
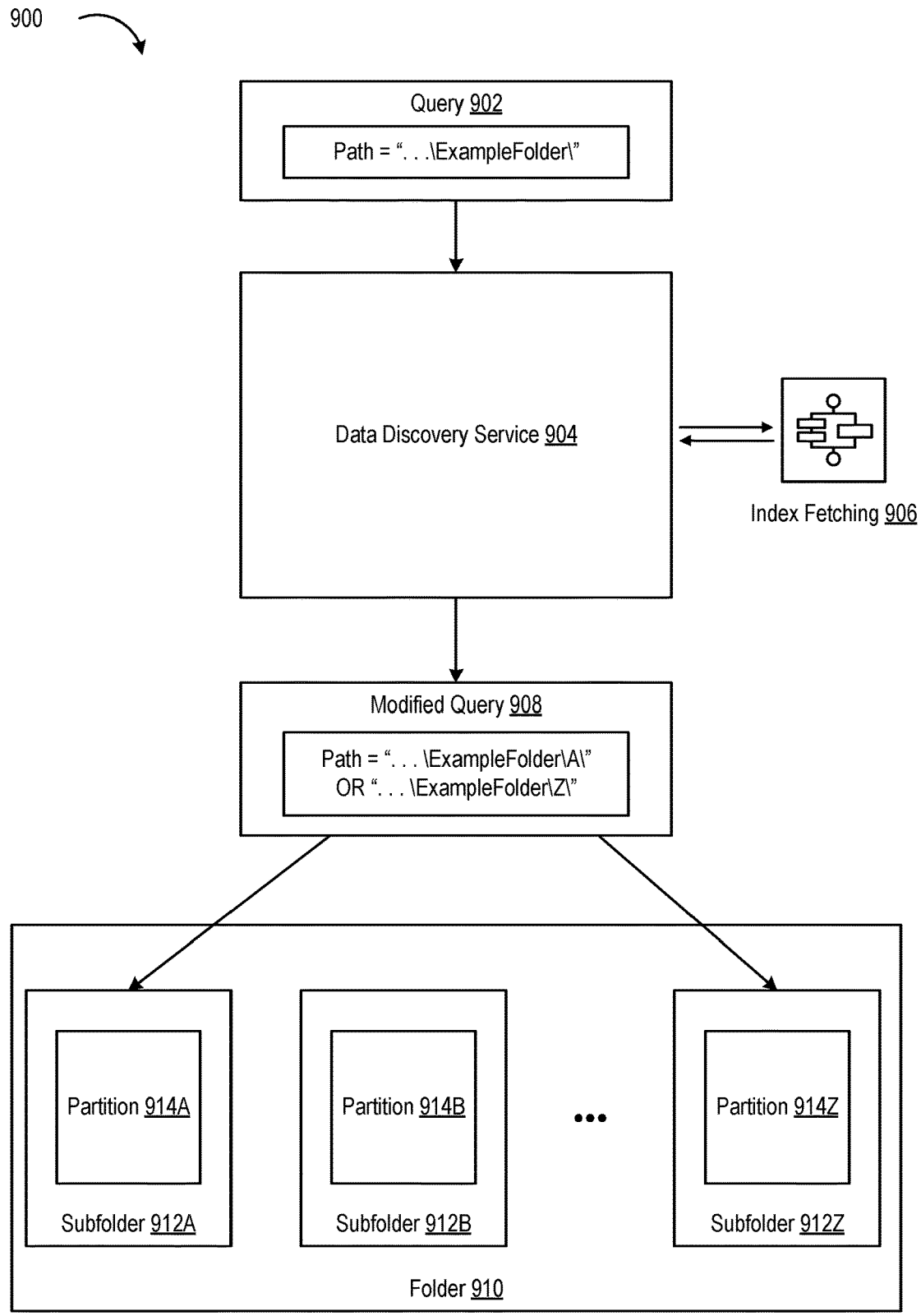
FIG. 9 illustrates an example of a computing environment in which a data discovery service receives a query request and modifies the query based on indexing information to produce a more efficient modified query, in accordance with at least one embodiment.

FIG. 9 illustrates an example of a computing environment 900 in which a data discovery service receives a query request and modifies the query based on indexing information to produce a more efficient modified query, in accordance with at least one embodiment. In various embodiments, a query 902 is received by a data discovery service 904 that connects to a big data service to fetch partition information and communicate with an indexing fetching 906 component which provides indexing information that is used to identify partitions related to a query request. Query 902 may include path information which indicates a data set to perform the query over. In at least one embodiment, rather than scanning each partition of the data set, index information can be utilized to exclude one or more partitions from being queried. For example, indexing information may indicate that a particular partition "B" can be excluded from the query. Data discovery service 904 may replace the path indicated in the query with updated path information, thereby producing modified query 908. The modified query may be more efficient than the original query 902 because the modified query scans fewer partitions—for example, in FIG. 9, the modified query 908 may scan only the partitions where a value being queried for is definitely or is possibly located in, whereas the partitions which definitely do not include the value being queried for are not scanned. In this way, and in at least one embodiment, techniques described herein improve the operation of a computing system by at least reducing the amount of resources needed to the fulfill client queries and/or by producing query results faster than would otherwise be possible without utilizing the techniques described herein.

As illustrated in FIG. 9, query 902 may specify a path of folder 910 which includes a data set that the client is requesting a search to be performed on. If query 902 were to be executed as submitted by the client, then each subfolder 912A, 912B, etc. would have to be searched in order to fulfill the query 902. However, as described in greater detail below, data discovery service 904 leverages indexing information to determine a filter that reduces the amount of data that is searched to fulfill the client request.

Data discovery service 904 may be implemented as a metadata service which receives client query requests such as query 902 illustrated in FIG. 9. Query 902 may a SQL statement or based on a SQL-like query language. While SQL queries are described herein, these are merely illustrative examples any other suitable query language or manner in which queries can be encoded are also contemplated within the scope of this disclosure. For example, a query 902 may indicate that the user requests all data objects that equal a certain value, selected from a table that is stored in a particular folder. For example, a data set stored within folder 910 may be organized into subfolders 912A, 912B, . . . , 912Z wherein each subfolder includes a respective partition 914A, 914B, . . . , 914Z of the data set being queried. Data discovery service 904 may include executable code that, as a result of execution, performs techniques such as those described in connection with FIG. 9.

Index fetching 906 may refer to a workflow which data discovery service 904 utilizes to obtain index information for a data set. Index fetching can be performed in any suitable manner using various computing resources. For example, index fetching may be performed using a step functions workflow in one embodiment. As a second example, index fetching can be performed using serverless compute resources. As a third example, index fetching can be performed by submitting a web service API request to a service provider that implements index fetching capabilities using one or more computer servers. A step functions workflow for index fetching 906 or various other workflows described throughout this disclosure can be represented as a state machine comprising one or more serverless functions or applications corresponding to nodes of the state machine and one or more directed edges defining how the workflow transitions from one stage to another. Index fetching 906 may be in accordance with those discussed elsewhere in this disclosure, such as those described in connection with FIG. 6 and FIG. 8. For example, data discover service 904 may obtain a set of indexing and/or incremental update Bloom filters for a set of partitions. In some embodiments, data discovery service 904 invokes an index creation workflow (not illustrated in FIG. 9) to create indexes if they are not available at query time. In some embodiments, indexes are distributed across multiple files. In some embodiments, large index files may be on the order of hundreds of gigabytes (e.g., for large scale data sets which may be on the order of petabytes or larger) which are split up into hundreds of jobs running in parallel to obtain index results within the order of seconds. Data discover service 904 may communicate with a data indexing system with a client SQL filter provided. If the filter is, for example, built around a customer ID, then the data discover service will run through the index and determine whether there are any partitions that include the customer ID and return those partitions as subfolders rather than the parent folder that includes all of the subfolders. For example, if the Bloom filters for subfolder 912A and 912Z indicate that the customer ID could include the customer ID being filtered for and that subfolder 912B definitely does not include the customer ID, then the client query is updated to search subfolders 912A and 912Z but not subfolder 912B. Updated query 908 includes updated path information so that the execution of updated query 908 searches only the subfolders that include candidate partitions.

In some embodiments, additional metadata or information relating to the data being queried is utilized to further refine the updated query. As noted above, Bloom filters have the possibility of providing false positives but not false negatives. For example, as shown in FIG. 9, it may be the case that the Bloom filter for partition 914A is a false positive because a different value from the value being queried for hashes to the same Bloom filter location. In some cases, additional information can be utilized to identify false positives—for example, if the query is for a specific customer ID and the partitions are organized by date, data discovery service 904 may determine when the customer ID was created and exclude all partitions from before the customer ID was created.

In some cases, query 902 is submitted as a job, and then job is briefly paused by data discover service 904 to fetch indexes and determine updated path information based on available indexes and/or metadata that can be used to refine the execution of the query. The updated path information may be inserted into query 902 and replace the client's original query path, thereby creating updated query 908. The job may then be unpaused, which allows the updated query 908 to be executed. Updated query 908 may, for example, scan partition 914A and 914Z because they were indicated (e.g., by index information and/or other metadata) to possibly include one or more values being queried for, and partition 914B may be excluded for being identified as a non-candidate partition that definitely does not include the value being queried for.

Figure 10:
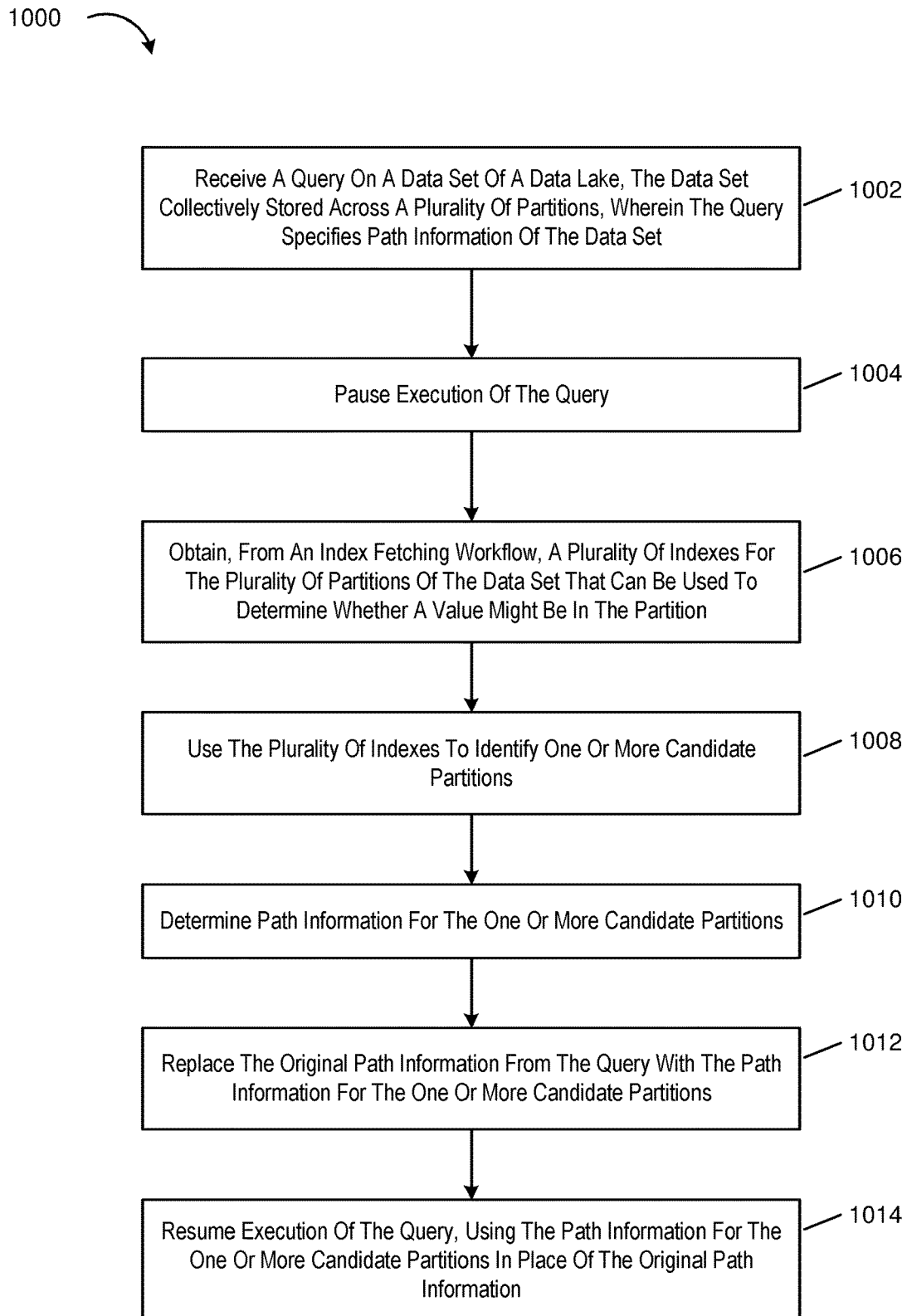
FIG. 10 shows an illustrative example of a process for efficient query optimization of distributed data sets, in accordance with at least one embodiment.

FIG. 10 shows an illustrative example of a process 1000 for efficient query optimization of distributed data sets, in accordance with at least one embodiment. In at least one embodiment, some or all of the process 1000 (or any other processes described herein, or variations and/or combinations thereof) is performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 1000 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 1000 may be implemented in the context of various systems and methods described elsewhere in this disclosure, such as those discussed in connection with FIGS. 1-9 and 11. For example, process 1000 can be performed by various components described in connection with FIGS. 1-9 and 11 utilizing one or more computing devices hosted and/or under the control of a computing resource service provider. In at least, a system comprising a data lake comprising a distributed object store, one or more processors, and one or more memories stores computer-executable instructions that, as a result of execution, cause the one or more processors to perform one or more steps of a process in accordance with FIG. 10.

In various embodiments, process 1000 comprises a step to receive 1002 a query on a data set of a data lake where the data set is collectively stored across a plurality of partitions, wherein the query specifies path information of the data set. The query may comprise a SQL statement or an expression written in another query language that specifies a value to search for over a table, over certain fields of a table, and so on. The query may include path information for a folder that includes subfolders for each of the partitions of a data set. The query may be in accordance with those described elsewhere, such as those discussed in connection with FIG. 8 and FIG. 9. As an example, the query may be to find all orders by a specific customer that is identified by a unique customer ID. In some embodiments, a client transmits a query request via a web API command over a network which is received by a front-end service of a computing resource service provider, which routes the request to a data discovery service which, upon receiving the request, proceeds to perform one or more additional steps of process 1000.

In various embodiments, process 1000 comprises a step to pause 1004 execution of the query. Pausing execution of a query may involve pausing a job for executing the query. The job may be paused monetarily—on the order of seconds—to perform an index fetching workflow and perform various other steps described in FIG. 10. A described below, once the path information is updated, the job may be subsequently resumed and executed based on the updated path information.

In various embodiments, process 1000 comprises a step to obtain 1006, from an index fetching workflow, a plurality of indexes for the plurality of partitions of the data set that can be used to determine whether a value might be in the partition. In various embodiments, the indexes are Bloom filters that can identify that a value can possibly be in a partition or that it is definitely not in the partition. Techniques for using Bloom filters to identify candidate partitions is described in greater detail elsewhere in this disclosure, such as above in connection with FIGS. 1-7. Indexing and/or incremental update Bloom filters may be utilized. In some cases, a data service performing process 1000 may invoke a workflow for index creation, as described in connection with FIG. 8.

In various embodiments, process 1000 comprises a step to use 1008 the plurality of indexes to identify one or more candidate partitions. Candidate partitions may be in accordance with those described elsewhere in this disclosure, such as those discussed in connection with FIG. 1. A candidate partition may be a partition that might be a relevant partition, but cannot be affirmatively excluded as a non-candidate partition, for example, based on a Bloom filter indicating that a value being queried for might possibly be stored in the partition. In some embodiment, the system identifies candidate partitions by enumerating through each partition and obtaining a respective index for the partition. The index may, for example, be a Bloom filter. A value being queried for may be hashed to determine a position in the Bloom filter such that if the position indicates a "set" state, then the partition in question is a candidate partition and that if the position indicates a "not set" state, then the partition in question is a non-candidate partition that can be excluded from the query.

In various embodiments, process 1000 comprises a step to determine 1010 path information for the one or more candidate partitions. In some embodiments, the path information for each partition is a subfolder of a folder. For example, the original client query may have included a folder path " . . . \ExampleFolder\" and partitions are included in child folders thereof, such as " . . . \ExampleFolder\ChildFolderA\" and " . . . \ExampleFolder\ChildFolderB\" and so on. The names of the folders may be indicative of how the data is partitioned. For example, all data collected from a date may be stored in a child folder for that date. Partitions may be organized chronologically, for example, with each folder name encoding a date. This naming convention can be utilized, in some embodiments, as metadata that can identify certain partitions as being non-candidate partitions. For example, if a query is searching for all items associated with a particular customer ID, then a system may obtain the date that the customer ID was created and exclude all partitions that were from before the customer ID was created as being non-candidate partitions. Determining path information may comprise mapping a candidate partition to a folder or child folder path. While folders and child folders are described herein, the same principles apply with objects that are stored in buckets—for example, query may encode a bucket with child buckets that each store a different partition.

In various embodiments, process 1000 comprises a step to replace 1012 the original path information from the query with the path information fort he one or more candidate partitions. For example, the query may be updated to include a filter expression that limits the query to scan only candidate partitions and to not scan non-candidate partitions. In some embodiments, the client's original query is modified by replacing a client-specified folder or bucket with a set of child folders or child buckets of the candidate partitions that were identified. In some embodiments, a filter is added to the client query without altering parameters that were specified by the client. For example, a single folder path may be replaced by multiple child folder paths. If a query originally specified a path PATH=" . . . \ExampleFolder\" to scan, then the updated path information may specify some but not all child folders of the originally specified path PATH=" . . . \ExampleFolder\ChildFolderA" OR " . . . \ExampleFolder\ChildFolderC" OR . . . based on which partitions were identified as candidate partitions and non-candidate partitions. In the preceding example, child folders A and C were identified as candidate partitions whereas partition B was determined to be a non-candidate partition.

In various embodiments, process 1000 comprises a step to resume 1014 execution of the query, using the path information for the one or more candidate partitions in place of the original path information. In this way, the query optimization can be performed more efficiently by skipping non-candidate and irrelevant partitions, effectively reducing the amount of scanning that is performed as part of fulfilling the query request.

In some embodiments, systems and methods may be utilized for obtaining a query, obtaining indexing information for the plurality of partitions, determining a filter for the query based on the indexing information, wherein the filter excludes a portion of the data set, updating the query with the filter, and causing the query to be executed in accordance with the filter. In some embodiments, the query specifies information for where the data set is located, such as a file or object path. Data can be located based on a resource name, network path, network location, and more. In some embodiments, determining the filter for the query based on the indexing information comprises identifying a set of candidate partitions based on the indexing information, obtaining second path information for where the set of candidate partitions is located, and specifying the second path information in the filter. In some cases, updating the query with the filter comprises replacing the first path information with the second path information. In various embodiments, the indexing information comprises one or more Bloom filters and determining the filter comprises determining that a Bloom filter for a partition indicates that the partition may be relevant to the query. In some embodiments, the method comprises pausing a job associated with the query to allow for the updated path information to be determined and for query parameter to be updated with a filter. The job may be resumed once the query has been updated. As an example, the data set may be partitioned chronologically and additional metadata can be used to determine that the filter should exclude partitions prior to a date determined based on the query. Continuing with the example, if the query is a search for all items associated with a customer ID, then all partitions (e.g., as determined based on folder name) that preceded the customer ID creation date chronologically can be identified as non-candidate partitions and properly excluded from the query.

In some embodiments, systems and methods may be utilized to obtain a query on a data set of a data lake, wherein the query comprises first path information provided by a client indicating where the data set is located, identify, based on indexing information of the data set, a subset of the data set to scan, determine second path information indicating a the subset of the data is located, replace the first path information with the second path information, and cause the query to be executed using the second path information in place of the first path information. In some embodiments, the first path information specifies a folder or bucket; and the second path information comprises one or more child folders of the folder or one or more child buckets of the bucket. In some embodiments, the subset of the data to scan is identified by obtaining Bloom filters for each partition of the data set and including the partition as part of the subset as a result of the Bloom filter for the partition indicating that the partition can possibly be relevant to the query, which may be based on a determination that the value being queried for could possibly be in the partition.

Examples and embodiments presented herein are not meant to be limiting.

FIG. 11 illustrates a block diagram of an example of a machine 1100 (e.g., implemented in whole or in part in the context of embodiments described in connection with other figures. In some embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in Wi-Fi direct, peer-to-peer (P2P) (or other distributed) network environments. The machine 1100 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (Saas), or other computer cluster configurations. In an embodiment, machine 11 is a server computer system, a server cluster, a virtual computer system, a virtual server, a virtual runtime environment, a container environment, a serverless execution environment, or service hosting system.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1100 may include any combination of the illustrated components. For example, the machine 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a power management device 1132, a graphics display device 1110, an alphanumeric input device 1112 (e.g., a keyboard), and a user interface (UI) navigation device 1114 (e.g., a mouse). In an example, the graphics display device 1110, alphanumeric input device 1112, and UI navigation device 1114 may be a touch screen display. The machine 1100 may additionally include a storage device (e.g., drive unit) 1116, a signal generation device 1118, and a network interface device/transceiver 1120 coupled to antenna(s) 1130. The machine 1100 may include an output controller 1134, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within the static memory 1106, or within the hardware processor 1102 during execution thereof by the machine 1100. In an example, one or any combination of the hardware processor 1102, the main memory 1104, the static memory 1106, or the storage device 1116 may constitute machine-readable media. Instructions 1124 may include computer-readable executable code that, as a result of execution, performs one or more steps of one or more processes described herein, such as processes described in connection with FIG. 7 and FIG. 10.

While the machine-readable medium 1122 is illustrated as a single medium, the term "machine-readable medium" may include a single medium or multiple media (e.g., a centralized or distributed database, and/or associated caches and servers) configured to store the one or more instructions 1124.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1100 and that cause the machine 1100 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device/transceiver 1120 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1120 may include one or more physical jacks (e.g., Ethernet, coaxial, or phone jacks) or one or more antennas to connect to the communications network 1126. In an example, the network interface device/transceiver 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1100 and includes digital or analog communications signals or other intangible media to facilitate communication of such software.

Computer system 1100 may include software and/or hardware implementation of data indexing system 1136 which may be in accordance with those described elsewhere in this disclosure, such as those discussed in connection with FIG. 1. In some embodiments, data indexing system 1136 is a software application or module (e.g., a dynamically linked library) that includes code, data, or other resources that are utilized to implement various functionalities described throughout this disclosure.

Pre-image resistant functions include one-way functions (i.e., functions that may not be computationally difficult to compute for a current value, but may not be computationally trivial to determine a previous value from the current value), having a recurrence relationship to a previous value of the function. The one-way membership function may not be mathematically proven/provable as one-way, but have computational complexity properties that render the function pre-image resistant. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (e.g., with the password being based at least in part on the plaintext and the cryptographic key) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of pre-image resistance (given a value y, the probability of randomly generating an input x such that $f(x)=y$ is below a specified threshold), second pre-image resistance (given an input $x_1$, the probability of randomly generating another input $x_2$, different from $x_1$, such that $f(x_1)=f(x_2)$ is below a specified threshold) and/or collision resistance (the probability of two different inputs resulting in the same output is less than a specified threshold). One-way functions suitable for use in generating an identifier for data include functions that satisfy properties of collision resistance (i.e., the probability of $f(x_1)=f(x_2)$ for different $x_1$ and $x_2$ is below a threshold). Other hash functions usable in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radiotelephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which may be used to store the information and which may be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Additionally, the phrase "based on" may be synonymous to "based at least in part on" rather than "based solely on" unless it is explicitly stated or clear from the context that the latter meaning is intended. Additionally, the various terms used throughout this disclosure may relate to various fields of mathematics, science, and/or engineering. These terms are to be interpreted according to their respective fields unless otherwise clear from the context in which they are being described. As a non-limiting example, the terms "proper subset" and "subset" are to be interpreted according to their definitions given in mathematical set theory, unless clearly indicated by the context.

What is claimed is:

1. A system, comprising:
a data lake comprising a distributed object store; and
a data indexing system comprising one or more processors and one or more memories storing computer-executable instructions that, as a result of execution, cause the one or more processors to:
generate an index for a plurality of fields in respective partitions in the data lake, wherein the index comprises a first plurality of Bloom filters that collectively indicates whether there is a possibility that a value is present in the data lake, wherein each Bloom filter is associated with a respective field of the plurality of fields;
generate, for the index, a second plurality of Bloom filters based on one or more updates to records of the data lake applied after generation of the first plurality of Bloom filters that reflect an updated state of one or more partitions;
storing the second plurality of Bloom filters;
receive a query indicating the value;
determine, using at least a portion of the first plurality of Bloom filters and the second plurality of Bloom filters, a set of candidate partitions where the value is possibly stored and a set of non-candidate partitions where the value is definitely not stored, wherein determining the set of candidate partitions includes,
determine, based on an updated partition list, whether a partition of the one or more partitions was subject to the one or more updates,
based on the updated partition list indicating that the partition was subject to the one or more updates, determine that the value is possibly stored in the partition based on a Bloom filter of the second plurality of Bloom filters associated with the partition;
determine, based on the updated partition list, whether a second partition of the one or more partitions was subject to the one or more updates, and
based on the updated partition list indicating that the second partition was not subject to the one or more updates, determine that the value is possibly stored in the second partition based on a Bloom filter of the first plurality of Bloom filters associated with the second partition;
determine, using the set of candidate partitions, one or more records that comprise the value in one or more partitions of the set of candidate partitions; and
fulfill the query by providing the one or more records.

2. The system of claim 1, wherein the one or more updates either modify or delete the records.

3. The system of claim 1, wherein the second plurality of Bloom filters is generated on a periodic basis.

4. A computer-implemented method, comprising:
generating a first plurality of probabilistic data structures associated with a field of a plurality of records stored in a plurality of partitions of a distributed data store, wherein a first probabilistic data structure of the first plurality of probabilistic data structures is associated with a first field of a first record of the plurality of records in a partition of the distributed data store and indicates whether a value could be present in the partition;
generating a second probabilistic data structure for the first field of the partition based on a change to the first field subsequent to generation of the first plurality of probabilistic data structures, wherein the second probabilistic data structure is an incremental update to the first probabilistic data structure;
storing the second probabilistic data structure;
determining an updated partition list that indicates that the partition was subject to one or more changes;
storing the updated partition list;
determining a set of partitions that comprises the partition, based on at least a portion of the first plurality of probabilistic data structures and the second probabilistic data structure, and
wherein determining that the value could be in the partition includes using the second probabilistic data structure on the partition based on the partition being in the updated partition list, and wherein determining that the value could be in a second partition of the distributed data store includes using a third probabilistic data structure on the second partition based on the second partition not being in the updated partition list; and
processing a query for the value using the set of partitions.

5. The computer-implemented method of claim 4, wherein processing the query for the value comprises searching for the value in the partition.

6. The computer-implemented method of claim 4, further comprising:
detecting the change to the partition; and
causing a distributed processing framework to generate the second probabilistic data structure based on the change to the partition being detected.

7. The computer-implemented method of claim 4, wherein processing the query comprises:
generating a filter expression comprising the set of partitions; and
scanning the distributed data store for the value and according to the filter expression to determine a subset of the set of partitions that is relevant to the query.

8. The computer-implemented method of claim 7, wherein the subset is a proper subset.

9. The computer-implemented method of claim 4, wherein the first probabilistic data structure is a Bloom filter.

10. The computer-implemented method of claim 4, wherein the change to the first field includes a modification of the first record of the partition.

11. The computer-implemented method of claim 4, wherein first probabilistic data structure comprises a plurality of positions, further wherein a position of the plurality of positions indicates that at least one value of a set of values is stored in the partition, the set of values comprising the value.

12. One or more non-transitory computer-readable storage mediums storing executable instructions that, as a result of being executed by one or more processors of a computer system, cause the computer system to at least:
identify a change to a first field of a plurality of fields of a partition of a distributed data store organized into a plurality of partitions, wherein the change is subsequent to generation of a first plurality of probabilistic data structures that indicate whether fields of a partition of the plurality of partitions lack a value;
generate an incremental update probabilistic data structure for the first field of the plurality of fields of the partition, after application of the change;
storing the incremental update probabilistic data structure;
determining an updated partition list that indicates that the partition was subject to one or more changes, and wherein a second partition of the distributed data store is not included in the updated partition list;
storing the updated partition list;
determine, based on the updated partition list, to use the incremental update probabilistic data structure on the partition and to use a second probabilistic data structure of the first plurality of probabilistic data structures on the second partition; and
determine, using the incremental update probabilistic data structure and the second probabilistic data structure, that at least one partition of the distributed data store is to be excluded from a search for the value.

13. The one or more non-transitory computer-readable storage mediums of claim 12, wherein the instructions, as a result of being executed by the one or more processors of the computer system, further cause the computer system to:
receive a query request for the value;
determine that data of the first field changed subsequent to the generation of the first plurality of probabilistic data structures;
obtain the incremental update probabilistic data structure as a result of determining that the data of the first field changed; and
determine, using the incremental update probabilistic data structure, that the partition is a non-candidate partition.

14. The one or more non-transitory computer-readable storage mediums of claim 12, wherein the instructions, as a result of being executed by the one or more processors of the computer system, further cause the computer system to:
identify a set of candidate partitions based on the incremental update probabilistic data structure and at least a portion of the first plurality of probabilistic data structures;

identify a set of non-candidate partitions based on the incremental update probabilistic data structure and at least a portion of the first plurality of probabilistic data structures, wherein the set of non-candidate partitions includes the partition, wherein the set of candidate partitions and the set of non-candidate partitions are mutually exclusive; and scanning the set of candidate partitions for the value to identify one or more partitions relevant to a query for the value.

15. The one or more non-transitory computer-readable storage mediums of claim 14, wherein the instructions, as a result of being executed by the one or more processors of the computer system, further cause the computer system to:

obtain, from the set of relevant partitions, one or more records with the value; and delete the one or more records.

16. The one or more non-transitory computer-readable storage mediums of claim 12, wherein:

the instructions to identify the change to the first field of the distributed data store, as a result of being executed by the one or more processors of the computer system, cause the system to determine, using logging metadata, that the change was applied to the partition subsequent to generation of the first plurality of probabilistic data structures; and the instructions, as a result of being executed by the one or more processors of the computer system, further cause the system to submit an update job to a distributed processing framework to cause the probabilistic data structure to be generated.

17. The one or more non-transitory computer-readable storage mediums of claim 12, wherein the incremental update probabilistic data structure is a Bloom filter.

18. The one or more non-transitory computer-readable storage mediums of claim 12, wherein the change comprises deletion of data from the first field.

19. The one or more non-transitory computer-readable storage mediums of claim 12, wherein a first partition of the plurality of partitions is stored on a first data storage device and a second partition of the plurality of partitions is stored on a second data storage device.

* * * * *